US011989517B2

(12) United States Patent
P et al.

(10) Patent No.: US 11,989,517 B2
(45) Date of Patent: May 21, 2024

(54) CONVERSATIONAL AUTOMATED MACHINE LEARNING

(71) Applicant: SAP SE, Walldorf (DE)

(72) Inventors: Meenakshi Sundaram P, Tirunelveli (IN); Gokulraj Ramdass, Walldorf (DE)

(73) Assignee: SAP SE, Walldorf (DE)

( * ) Notice: Subject to any disclaimer, the term of this patent is extended or adjusted under 35 U.S.C. 154(b) by 302 days.

(21) Appl. No.: 17/473,891

(22) Filed: Sep. 13, 2021

(65) Prior Publication Data
US 2023/0078800 A1     Mar. 16, 2023

(51) Int. Cl.
| | | |
|---|---|---|
| *G06F 40/30* | (2020.01) | |
| *G06F 9/48* | (2006.01) | |
| *G06F 18/21* | (2023.01) | |
| *G06F 40/295* | (2020.01) | |
| *G06F 40/40* | (2020.01) | |
| *G06N 20/00* | (2019.01) | |

(52) U.S. Cl.
CPC .......... *G06F 40/295* (2020.01); *G06F 9/4881* (2013.01); *G06F 18/2178* (2023.01); *G06F 40/40* (2020.01); *G06N 20/00* (2019.01)

(58) Field of Classification Search
CPC .......... G06N 20/20; G06N 3/045; G06N 3/02; G06N 3/08; G06F 40/30; G06F 40/35; G06F 40/56; G06F 40/279; G06F 40/295; G06F 40/40; G10L 15/22; G10L 15/1822; G10L 15/1815; G10L 15/063; G10L 15/18
See application file for complete search history.

(56) References Cited

U.S. PATENT DOCUMENTS

2021/0081819 A1* 3/2021 Polleri .................... H04L 51/02

* cited by examiner

*Primary Examiner* — Jakieda R Jackson
(74) *Attorney, Agent, or Firm* — Fountainhead Law Group P.C.

(57) ABSTRACT

Traditional machine learning model development requires significant domain knowledge and time to produce and compare models. The present disclosure provides techniques for performing automated machine learning using a conversational interface. A dataset is identified based on a user selection. A machine learning problem type and an analysis type are determined based on user input provided to the conversational interface. Machine learning algorithms are determined based on the dataset, the machine learning problem type, and the analysis type. A routing slip specifying a sequence of processing steps is generated for each of the machine learning algorithms based on the dataset, problem type, and analysis type. The sequence of processing steps in the routing slip are performed for each of the machine learning algorithms. An accuracy score is determined for each of the machine learning models generated. The accuracy scores are presented to the user via the conversational interface.

20 Claims, 20 Drawing Sheets

| Steps | Coreletion ID | Status code |
|---|---|---|
| Cleansing | 1000 | Completed |
| Validation | 1010 | Completed |
| Auto data pre-processing | 1020 | Completed |
| Features Selection | 1030 | Completed |
| Auto EDA | 1040 | Completed |
| Parameters Selection | 1050 | Completed |
| Tuning | 1060 | |
| Model Training | 1070 | |
| Model Validation | 1080 | |
| Model Versioning | 1090 | |
| Model Deployment | 1100 | |

FIG. 6

CONVERSATIONAL AUTOMATED MACHINE LEARNING

BACKGROUND

The present disclosure pertains to machine learning and in particular to use of conversational natural language processing to automate machine learning, including preprocessing, model building, model training, testing, and validation, and model deployment.

Conventional machine learning model development is resource-intensive and requires significant domain knowledge to generate and compare machine learning models. Data scientists in the field of machine learning have the knowledge that is required to define parameters for preprocessing the dataset and to set the machine learning hyperparameters for training, for example. However, machine learning data scientists may not be domain experts in the underlying field from which the dataset was collected. And domain experts in the field from which the dataset was collected may not be knowledgeable in machine learning. While domain experts may collaborate with machine learning data scientists may to design a machine learning model appropriate for their needs, this may result in repetitive manual steps in the model building process while selecting and fine-tuning models and other caused by collaboration. And even if the data scientist is also a domain expert, fine-tuning the models may involve repetitive manual steps.

There is a need for machine learning model generation and selection that avoids repetitive manual steps and that does not require data scientist expertise. The present disclosure addresses these issues and others, as further described below.

SUMMARY

One embodiment provides a computer system comprising one or more processors. The computer system further comprises one or more machine-readable medium coupled to the one or more processors and storing computer program code comprising sets of instructions executable by the one or more processors. The sets of instructions are executable to identify a dataset based on a user selection. The sets of instructions are further executable to determine a machine learning problem type and an analysis type based on user input provided to a conversational interface. The sets of instructions are further executable to determine one or more machine learning algorithms based on the dataset, the machine learning problem type, and the analysis type. The sets of instructions are further executable to generate a routing slip for each of the one or more machine learning algorithms based on the dataset, the machine learning problem type, and the analysis type. Each routing slip specifies a sequence of processing steps based on the dataset and a particular machine learning algorithm. The sequence of processing steps includes a machine learning parameter selection step and a machine learning model training step. The sets of instructions are further executable to perform the sequence of processing steps specified in the routing slip for each of the one or more machine learning algorithms to generate one or more machine learning models. The machine learning model training step generating a machine learning model using parameters selected in the machine learning parameter selection step. The sets of instructions are further executable to determine an accuracy score for each of the one or more machine learning models. The sets of instructions are further executable to present the accuracy score for each of the one or more machine learning models to the user via the conversational interface.

Another embodiment provides one or more non-transitory computer-readable medium storing computer program code. The computer program code comprising sets of instructions to identify a dataset based on a user selection. The computer program code further comprising sets of instructions to determine a machine learning problem type and an analysis type based on user input provided to a conversational interface. The computer program code further comprising sets of instructions to determine one or more machine learning algorithms based on the dataset, the machine learning problem type, and the analysis type. The computer program code further comprising sets of instructions to generate a routing slip for each of the one or more machine learning algorithms based on the dataset, the machine learning problem type, and the analysis type. Each routing slip specifies a sequence of processing steps based on the dataset and a particular machine learning algorithm. The sequence of processing steps includes a machine learning parameter selection step and a machine learning model training step. The computer program code further comprising sets of instructions to perform the sequence of processing steps specified in the routing slip for each of the one or more machine learning algorithms to generate one or more machine learning models. The machine learning model training step generating a machine learning model using parameters selected in the machine learning parameter selection step. The computer program code further comprising sets of instructions to determine an accuracy score for each of the one or more machine learning models. The computer program code further comprising sets of instructions to present the accuracy score for each of the one or more machine learning models to the user via the conversational interface.

Another embodiment provides a computer-implemented method. The computer-implemented method comprises identifying a dataset based on a user selection. The computer-implemented method further comprises determining a machine learning problem type and an analysis type based on user input provided to a conversational interface. The computer-implemented method further comprises determining one or more machine learning algorithms based on the dataset, the machine learning problem type, and the analysis type. The computer-implemented method further comprises generating a routing slip for each of the one or more machine learning algorithms based on the dataset, the machine learning problem type, and the analysis type. Each routing slip specifies a sequence of processing steps based on the dataset and a particular machine learning algorithm. The sequence of processing steps including a machine learning parameter selection step and a machine learning model training step. The computer-implemented method further comprises performing the sequence of processing steps specified in the routing slip for each of the one or more machine learning algorithms to generate one or more machine learning models. The machine learning model training step generating a machine learning model using parameters selected in the machine learning parameter selection step. The computer-implemented method further comprises determining an accuracy score for each of the one or more machine learning models. The computer-implemented method further comprises presenting the accuracy score for each of the one or more machine learning models to the user via the conversational interface.

The following detailed description and accompanying drawings provide a better understanding of the nature and advantages of the present disclosure.

BRIEF DESCRIPTION OF THE DRAWINGS

FIG. 6 shows a diagram of an exemplary routing slip, according to an embodiment.

DETAILED DESCRIPTION

Figure 1:
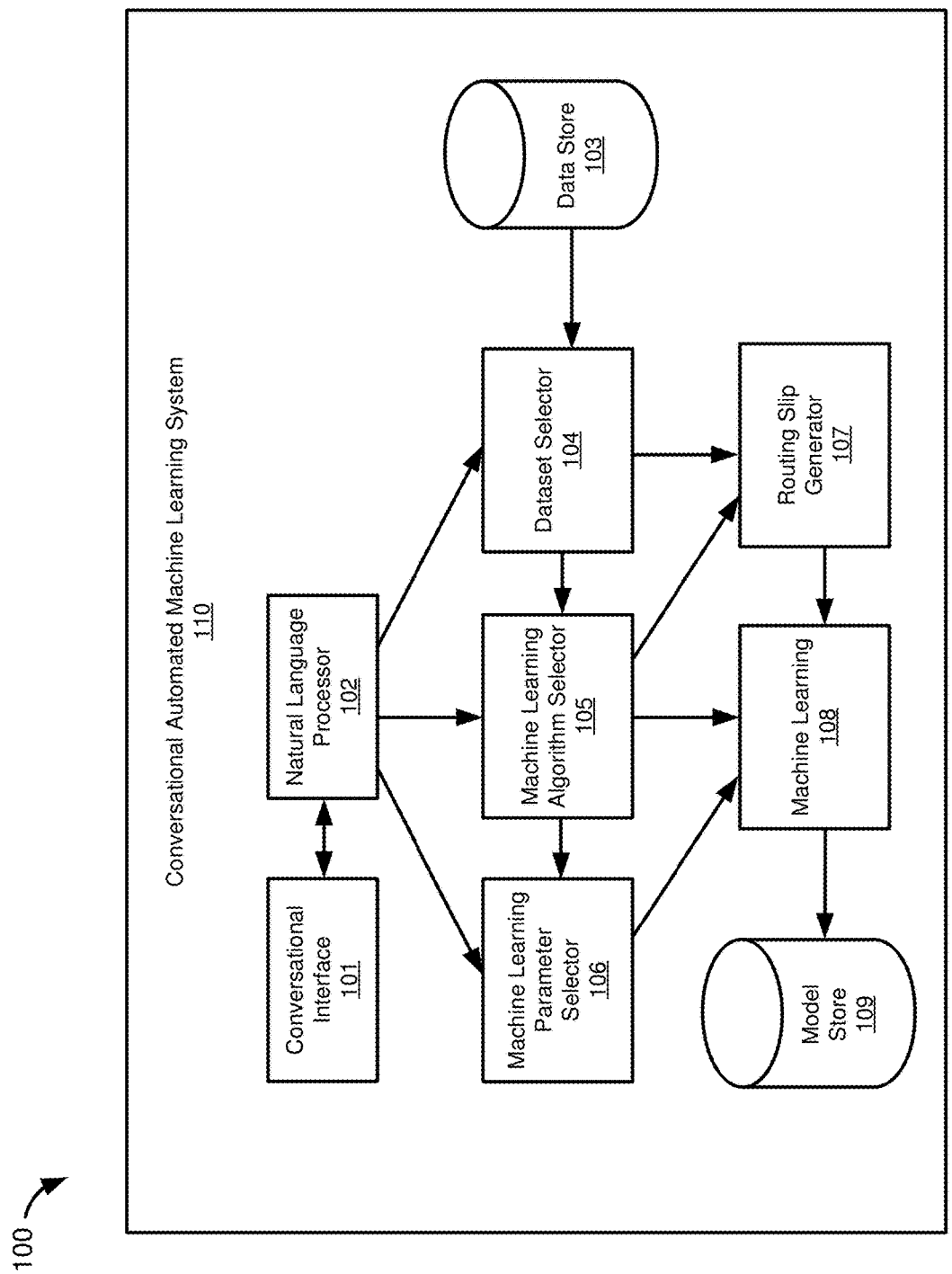
FIG. 1 shows a diagram of a conversational automated machine learning system, according to an embodiment.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein. While certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. Furthermore, the terms "first," "second," "third," "fourth," etc., used herein do not necessarily indicate an ordering or sequence unless indicated. These terms may merely be used for differentiation between different objects or elements without specifying an order.

As described above, conventional machine learning model development is resource-intensive and requires significant domain knowledge to generate and compare machine learning models. Data scientists in the field of machine learning have the knowledge that is required to define parameters for preprocessing the dataset and to set the machine learning hyperparameters for training, for example. However, machine learning data scientists may not be domain experts in the underlying field from which the dataset was collected. And domain experts in the field from which the dataset was collected may not be knowledgeable in machine learning. While domain experts may collaborate with machine learning data scientists may to design a machine learning model appropriate for their needs, this may result in repetitive manual steps in the model building process while selecting and fine-tuning models and other caused by collaboration. And even if the data scientist is also a domain expert, fine-tuning the models may involve repetitive manual steps.

To address these problems, systems and methods for conversational Automated machine learning (CaML) provide automation of time consuming, iterative tasks of machine learning model development using Conversational Interfaces. It allows data scientists, analysts, and developers to build ML models with high scale, efficiency, and productivity all while sustaining model quality.

As mentioned above, traditional machine learning model development is resource-intensive, requiring significant domain knowledge and time to produce and compare dozens of models. Machine learning models may be trained and tuned using target metrics specified over Conversational Interfaces. An automated machine service may iterate through several machine learning algorithms paired with feature selections, where each iteration produces a model with an accuracy score based on validation of the model. The higher the accuracy score, the better the model is considered to fit your data.

Features and advantages of conversational automated machine learning is that it enables a new class of "citizen data scientists" (e.g., domain experts without machine learning expertise) with the power to create advanced machine learning models, all without having to learn to code or understand the differences between different machine learning algorithms. Furthermore, data scientists may be more productive as repetitive steps in the model building process are automated, allowing them to use their unique expertise for selecting and fine-tuning models. Automated machine learning may replace much of the manual work required by a more traditional data science process. The conversational automated machine learning techniques described herein also provide for automatic data collection and filtering, diverse options for configuration, analysis and visualization, continuous and automated analysis of models, enables developers with limited machine learning expertise to train high-quality models specific to their needs, achieves faster performance and more accurate predictions with the machine learning models, and provides conversational user interface to train, evaluate, improve, and deploy models based on a selected dataset.

FIG. 1 shows a diagram 100 of a conversational automated machine learning system 110, according to an embodiment. The system 110 includes a conversational interface 101 that may interface with an end user. The conversational interface 101 provides "chat bot" functionality in which the system 110 provides text (e.g., a query or a notification) to a user and receives input from the user in text form. The system 110 includes a natural language processor 102 to determine the intent of the user (e.g., their request or response) and any entities (e.g., a selection) identified by the user.

The natural language processing information may be used by a dataset selector 104 to obtain a particular dataset from a datastore 103 as selected by the user. The natural language processing information may also be used by a machine learning algorithm selector 105 to select one or more machine learning algorithms based on a type of analysis (e.g., sentiment analysis) indicated by the user via the conversational interface 101. The one or more machine learning algorithms may also be based on a machine learning problem type (e.g., classification or regression) identified by the user via the conversational interface 101. The one or more machine learning algorithms may also be based on the particular dataset (e.g., dataset size or number of variables in the dataset. The natural language processing information may also be used by a machine learning parameter selector. The parameters may be automatically selected or they may be manually input.

A routing slip may be generated by a routing slip generator 107 for each of the machine learning algorithms selected. The routing slip may specify a particular sequence of processes to be performed, including preprocessing of the data and training of the machine learning model. The routing slip may be attached to the dataset and used to route between various microservices of the conversational automated machine learning system 110 that perform machine learning 108. The one or more machine learning models generated by machine learning 108 may be stored in a model store 109.

The routing slip and process for performing machine learning based on the conversational interface is further described below.

Figure 2:
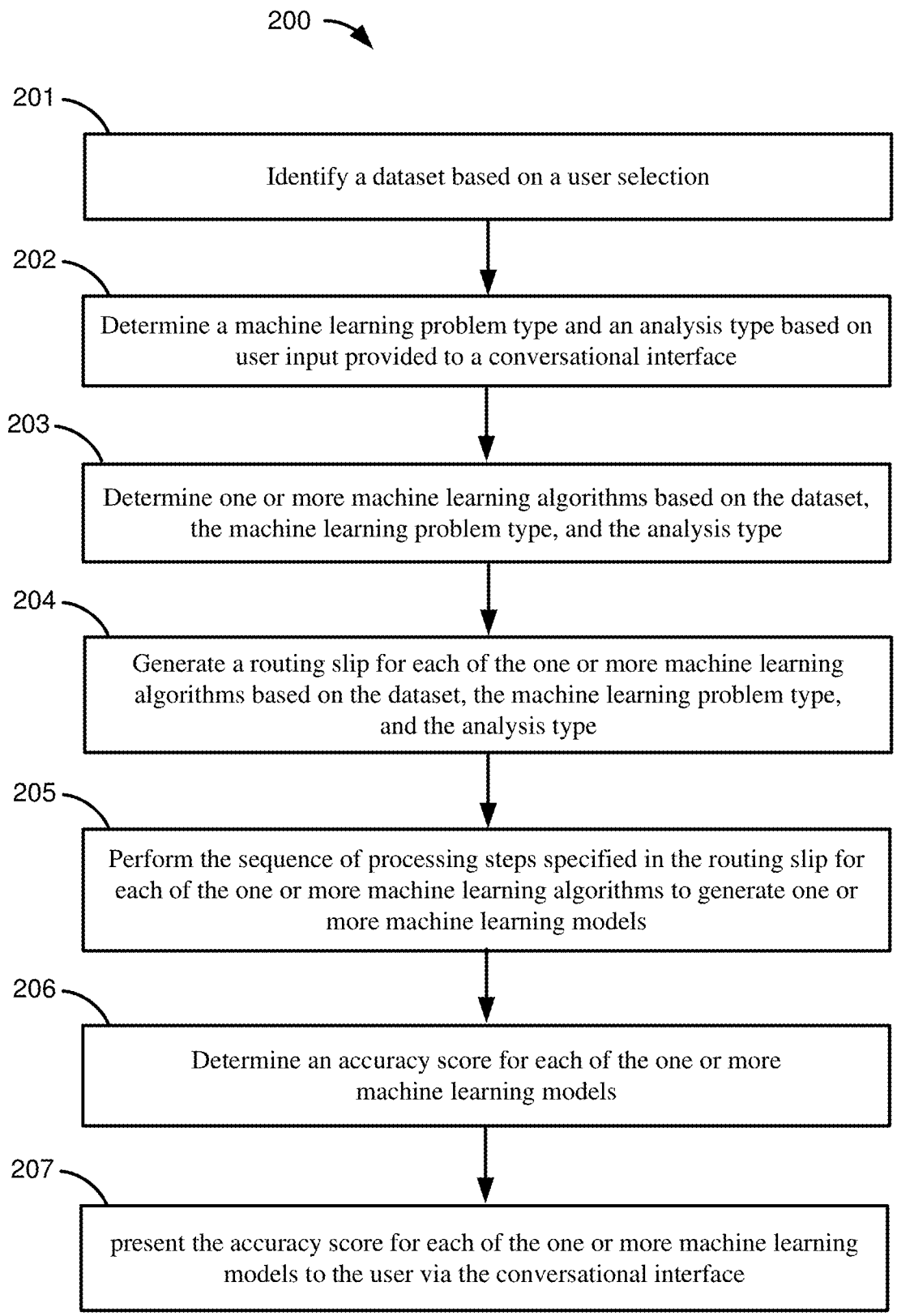
FIG. 2 shows a flowchart of a method for generating machine learning models using a conversational interface, according to an embodiment.

FIG. 2 shows a flowchart 200 of a method for generating machine learning models using a conversational interface, according to an embodiment. The method may be performed by a conversational automated machine learning system as described herein.

At 201, the method may identify a dataset based on a user selection. The user may select a particular dataset using a conversation interface and prompts from the conversational interface. For example, the user may select a dataset as described below with respect to FIG. 11. The dataset may be uploaded to a data store, such as the data store of the conversational automated machine learning system described herein.

At 202, the method may determine a machine learning problem type and an analysis type based on user input provided to a conversational interface. The machine learning problem type may be a classification problem type, a regression problem type, or another problem type, for example. The analysis type may be a sentiment analysis type as described herein or another type of analysis, for example.

At 203, the method may determine one or more machine learning algorithms based on the dataset, the machine learning problem type, and the analysis type. For example, if the machine learning problem type is a classification problem type, then the method may determine a Random Forest classifier, a Decision Tree classifier, or an Ada Boost classifier, for example. The machine learning algorithms may also be based on the analysis type. For example, accuracy scores for previously trained machine learning models may be used to identify which machine learning algorithms provide more accurate models for a particular analysis type and which machine learning algorithms provide less accurate models for that particular analysis type. The machine learning algorithms providing more accurate models may be determined to be used to train models for the current data set while the machine learning algorithms that are less accurate for that analysis type may not be determined to be used for training the current data set.

As one example, previous sentiment analysis types of analysis may be more accurate using random forest classifier models and decision tree classifier models compared to ada boost classifier models. In this example, the method may determine to use the random forest classifier algorithm and the decision tree classifier algorithm but not the ada boost classifier algorithm for a new dataset to perform sentiment analysis.

At 204, the method may generate a routing slip for each of the one or more machine learning algorithms based on the dataset, the machine learning problem type, and the analysis type. Each routing slip specifies a sequence of processing steps based on the dataset and a particular machine learning algorithm. The sequence of processing steps includes a machine learning parameter selection step and a machine learning model training step. In one example, a routing slip may list steps for cleansing, validation, automatic data pre-processing, features selection, automatic exploratory data analysis, parameters selection, tuning, model training, model validation, model versioning, and model deployment. Routing slips for different data sets may include a different list of steps. The routing slip may also include a status identifier, such as "completed," "incomplete," a blank or empty status, or "in progress," for each of the steps, for example. In some embodiments, each of the processing steps may be performed by a different service, which a system may access which may access using an application programming interface. In some embodiments, these different services may be deployed as different JavaScript containers, for example.

At 205, the method may perform the sequence of processing steps specified in the routing slip for each of the one or more machine learning algorithms to generate one or more machine learning models. The machine learning model training step may generate a machine learning model using parameters selected in the machine learning parameter selection step. In some embodiments, a training data set, a validation data set, and a test data set may be selected and used in the sequence of processing steps. In some embodiments these datasets may be preprocessed.

At 206, the method may determine an accuracy score for each of the one or more machine learning models. In some embodiments, the accuracy score may be determined for each of the one or more machine learning models using one or both of the test data set and the validation data asset.

Figure 19:
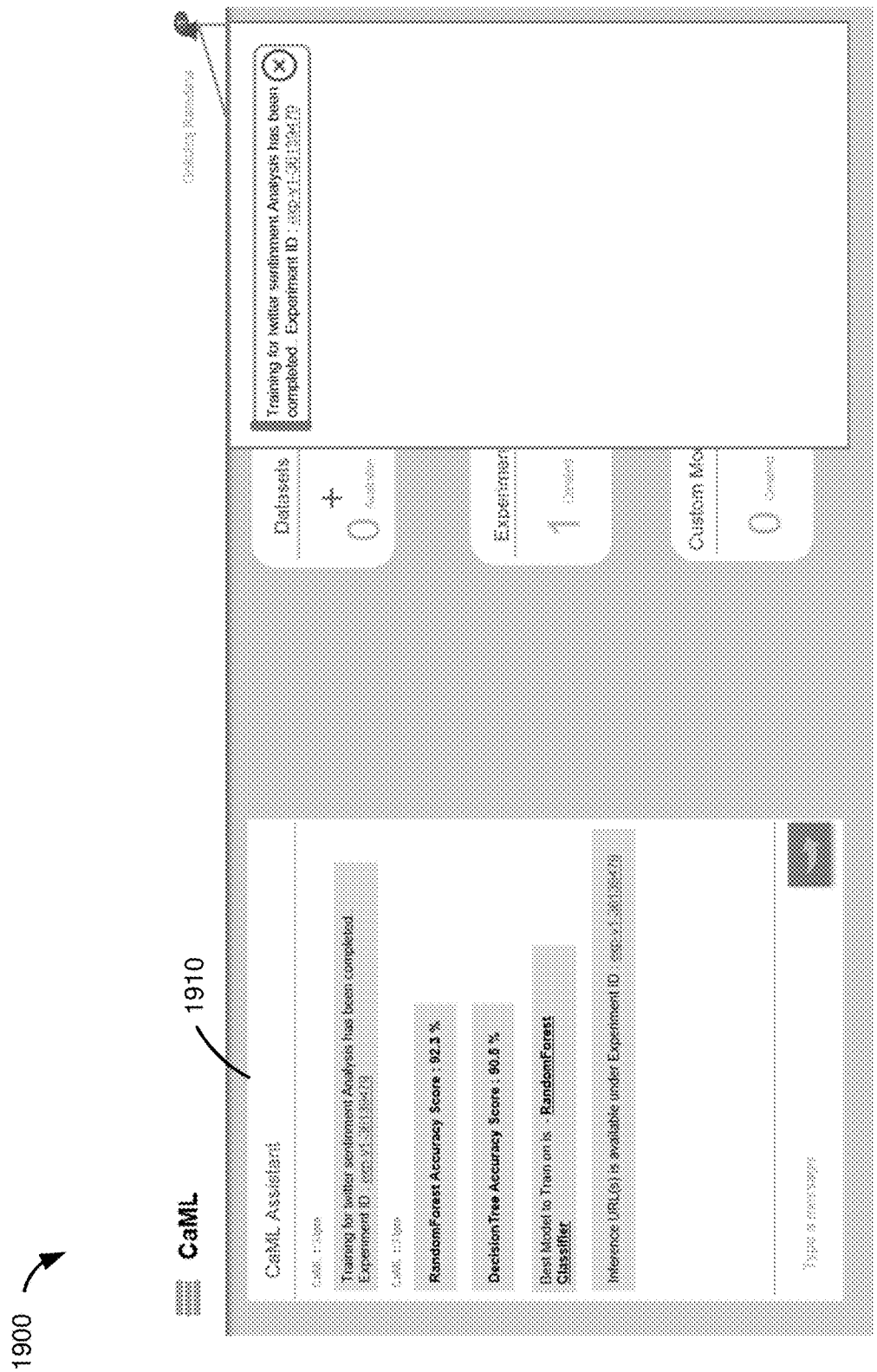
FIG. 19 shows a diagram of a conversational user interface providing accuracy scores for two machine learning models, according to an embodiment.

At 207, the method may present the accuracy score for each of the one or more machine learning models to the user via the conversational interface. For example, the accuracy score may be an accuracy score as shown in FIG. 19. A recommendation for the machine learning model having the highest accuracy score may also be presented. In some embodiments, the most accurate machine learning model may be selected for use in machine learning inference, in which other data is applied to the machine learning model to generate an outcome (e.g., a classification label if the model is a classification type model).

Figure 3:
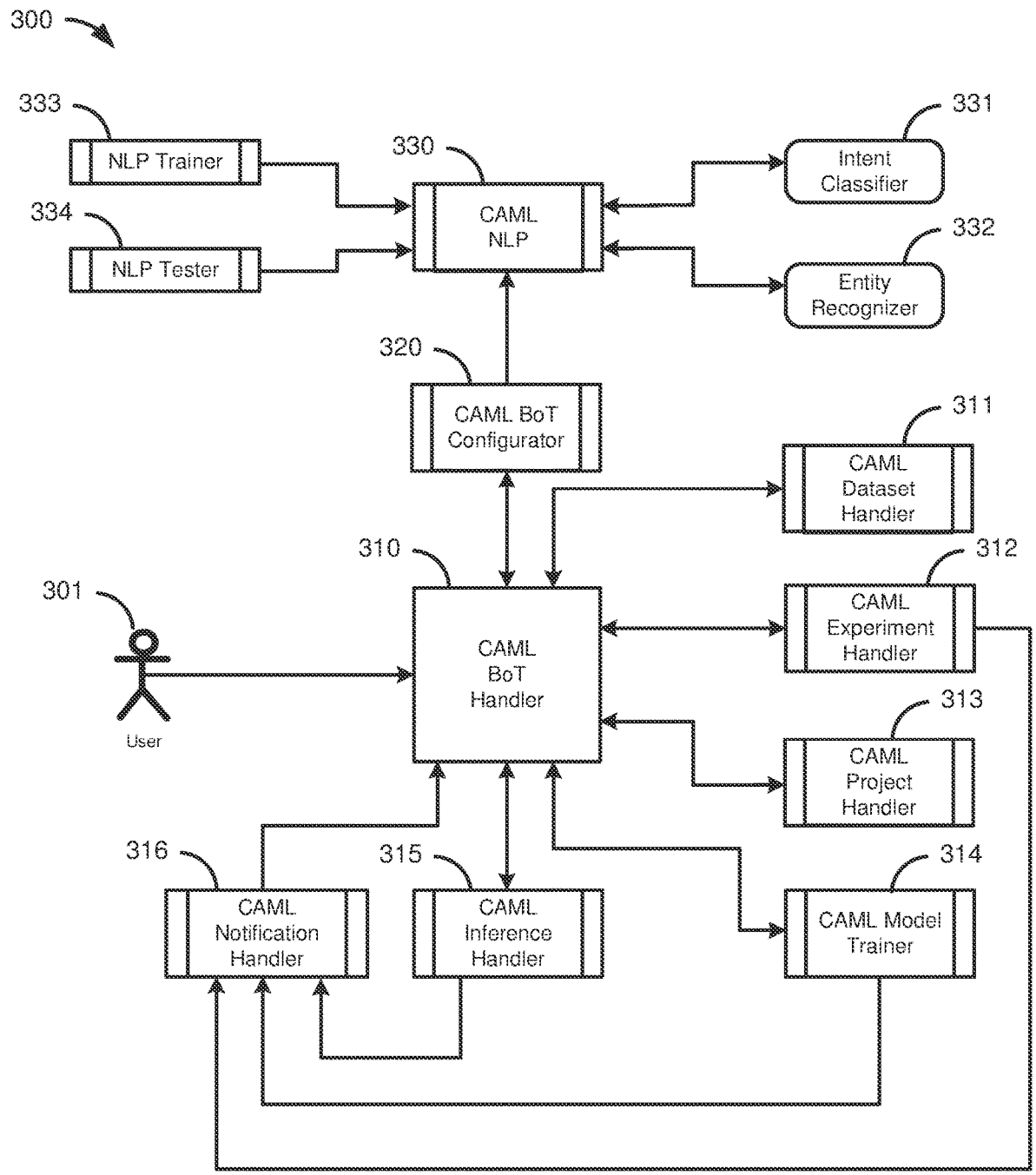
FIG. 3 shows a diagram of components of a conversational automated machine learning software application, according to an embodiment.

As described above, a conversational automated machine learning (referred to as CaML herein) system may provide a conversational interface may be used to train machine learning models. FIG. 3 shows a diagram 300 of components of a conversational automated machine learning software application, according to an embodiment. The conversational automated machine learning software application described herein may be implemented by the conversational automated machine learning system described herein. The application is based on a natural language processing (NLP) user interface 330 and a "chat bot" BoT Configurator 320 component which connects with a BoT Handler 310 component to interact with different components such as a Dataset Handler 311, an Experiment Handler 312, a Project Handler 313, a Model Trainer 314, an Inference Handler 315, and a Notification Handler 316, for example. An end user 301 interacts with the Bot Handler 310 via the Natural language.

The CaML NLP Component 330 connects with Intent Classifier 331, Entity Recognizer 332, NLP Trainer 333, NLP Tester 334. The NLP Component 330 handles the Linguistic Rules, Natural language generation, Intent Matching, and Intent Recognition, for example.

The different users 301 may log into the Chat Application and after successful authorization and authentication, the session management of the user is started for further processing. When the user 301 uploads the Data Set in the application, the application may request the User 301 to identify the problem type like Classification, Regression, etc. Based on input from the user (e.g., the project name) a type of analysis is identified (e.g., sentiment analysis) and all the generated Artifacts are classified. The user may then select or upload the Training data, Validation data, Test data, etc., for further processing.

The application analyzes the dataset and trigger the needed activities based on the User confirmation according to a routing slip generated for each machine learning algorithm to be used. When the Dataset is uploaded the application triggers the Auto Data Preprocessing and it notifies the User when the specific step is completed. Then the next step, Exploratory data analysis (EDA) is triggered and completed based on the user Request. These steps are performed in sequence according to the routing slip.

Figure 14:
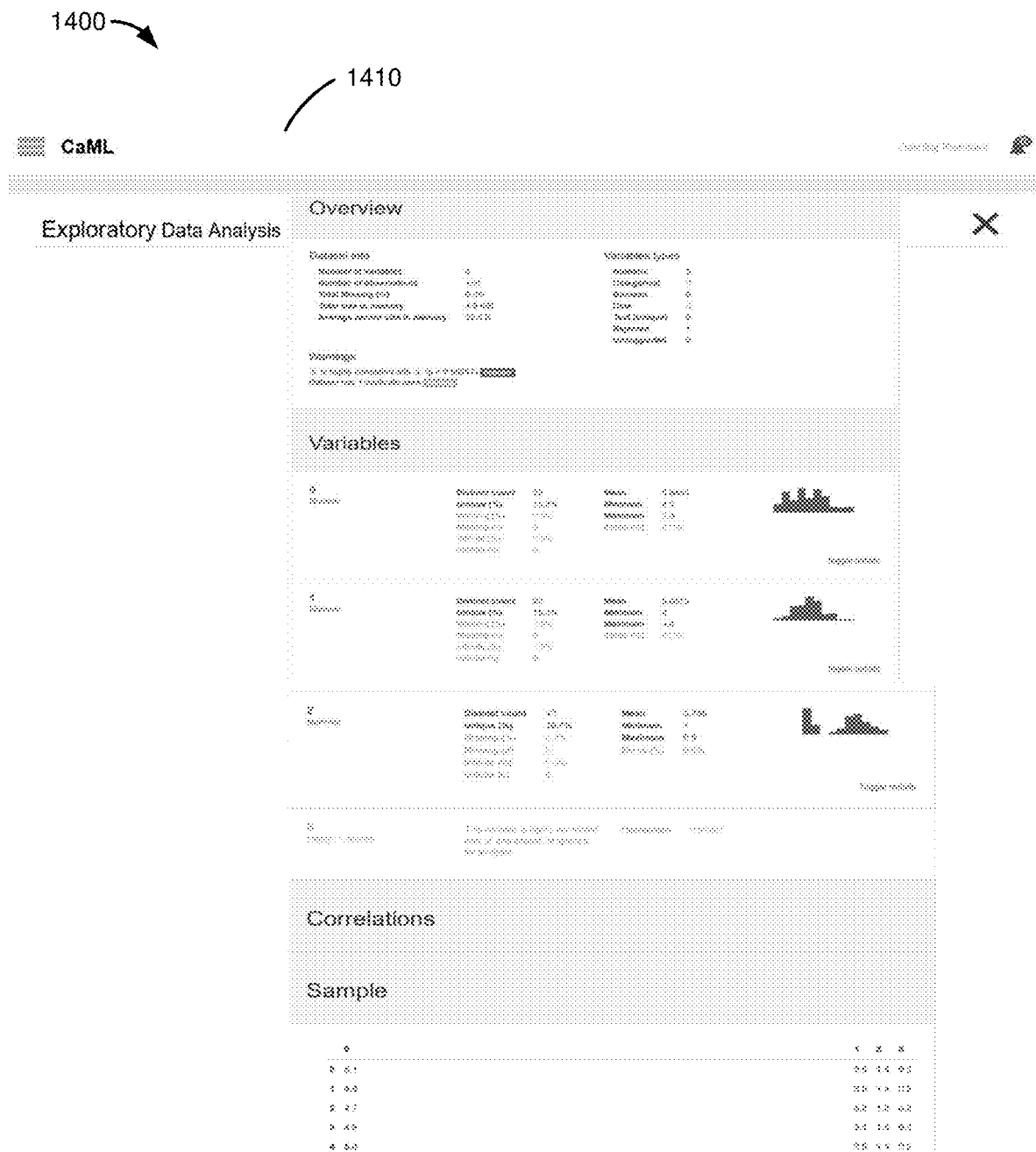
FIG. 14 shows a diagram of an interface presenting the exploratory data analysis, according to an embodiment.
Figure 16:
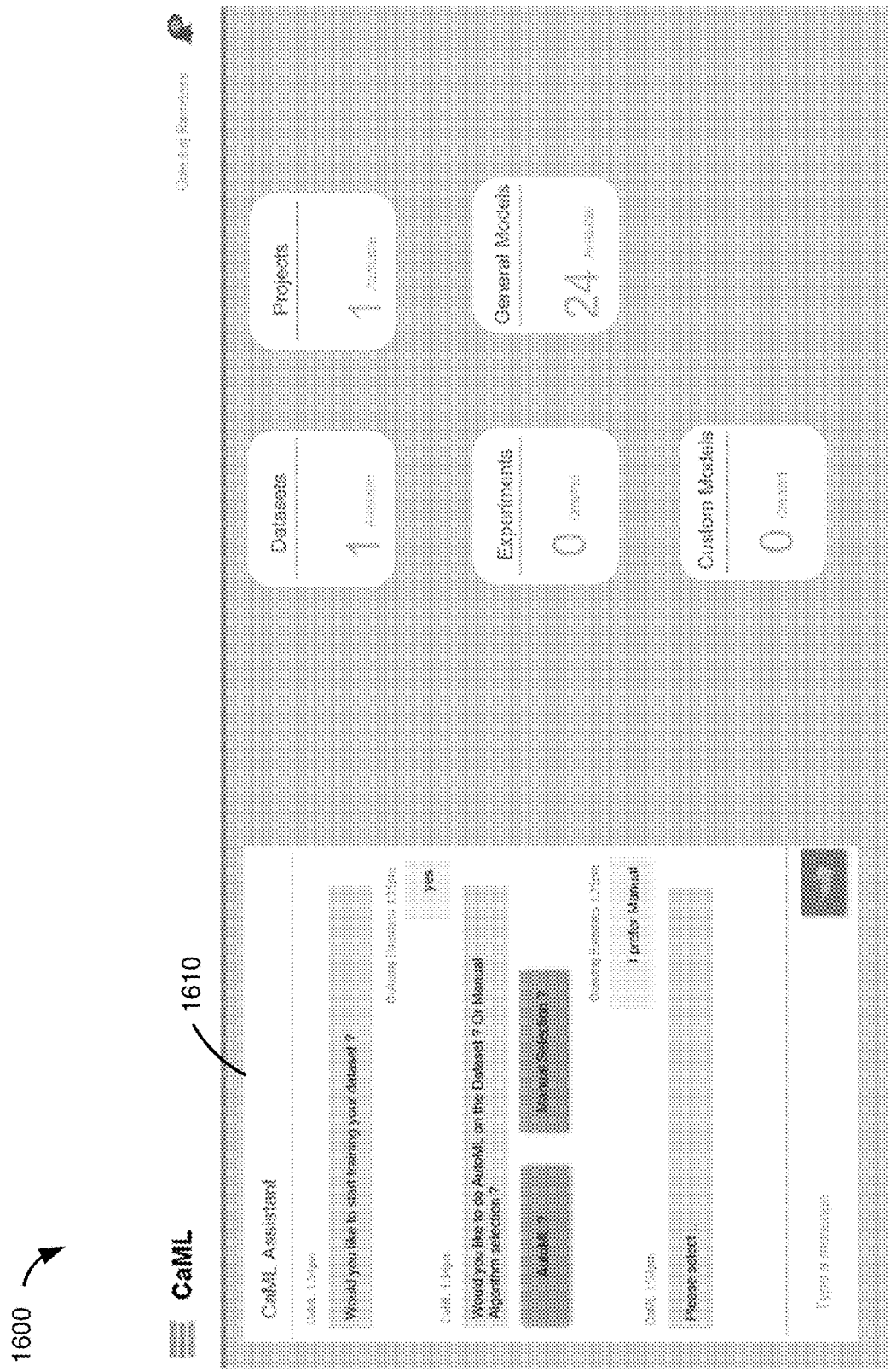
FIG. 16 shows a diagram of a conversational user interface querying the user regarding machine learning algorithm selection, according to an embodiment.
Figure 17:
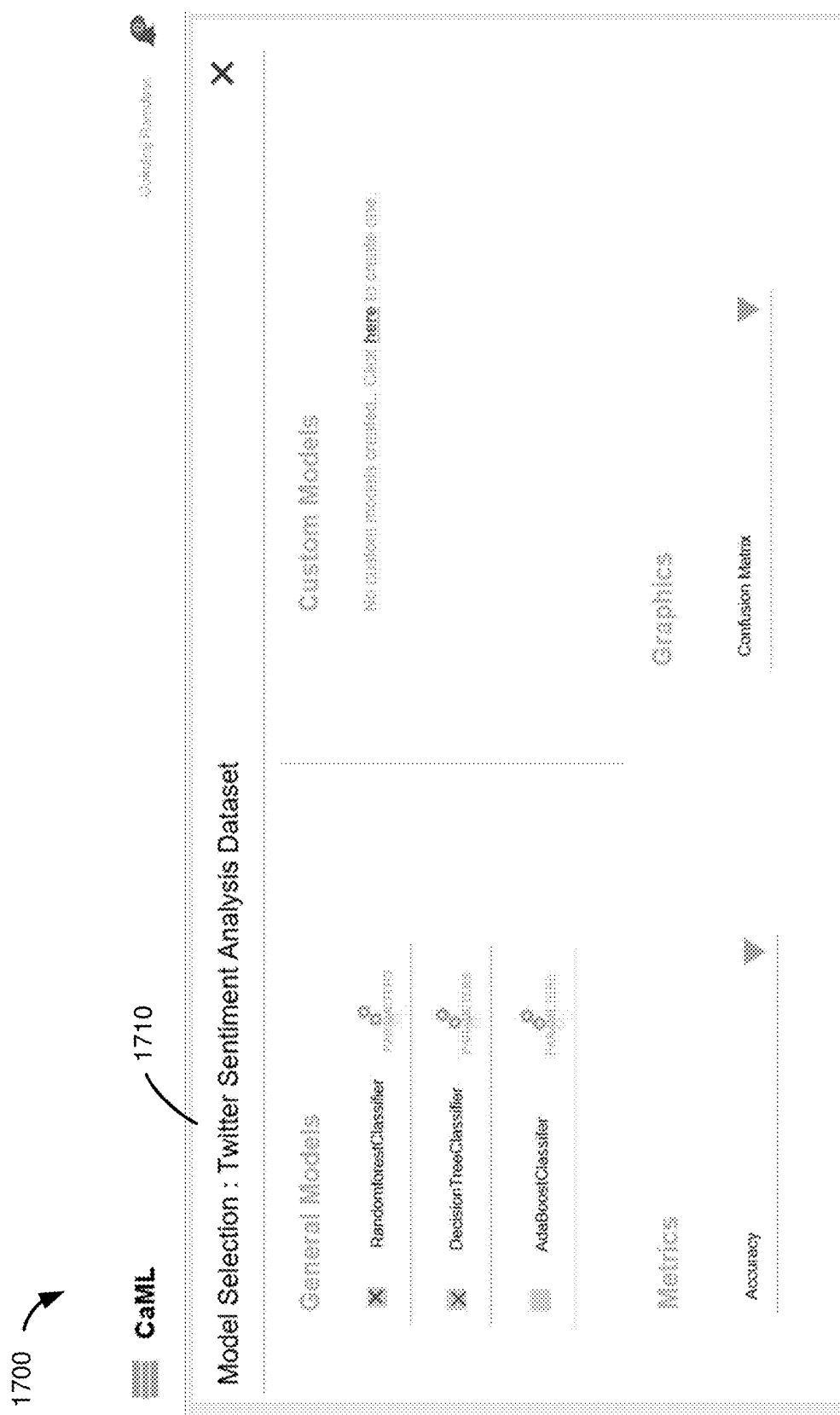
FIG. 17 shows a diagram of a user interface for selecting types of machine learning models to be generated, according to an embodiment.

The details of the exploratory data analysis are displayed with all the relevant details. An example of exploratory data analysis is shown in FIG. 14. When EDA is completed, the training of the dataset may begin. The User can select to do an Auto ML or a Manual Algorithm on the dataset using the conversational interface. An example is shown in FIG. 16. The list of algorithms is displayed to the user along with the different parameters. As example user interface for manual selection of the machine learning algorithms used to build models is shown in FIG. 17. When the Training is completed, the accuracy scores for the models are displayed to the user. An example of the conversational interface presenting accuracy scores to the user is shown in FIG. 19.

Based on the dataset and the problem type, the application may automatically select multiple machine learning algorithms to be used. The user may also manually select machine learning algorithms. Accuracy scores for the different machine learning algorithms are then displayed to the User. The application may recommend the algorithm having the highest accuracy score via the conversational interface.

Figure 4:
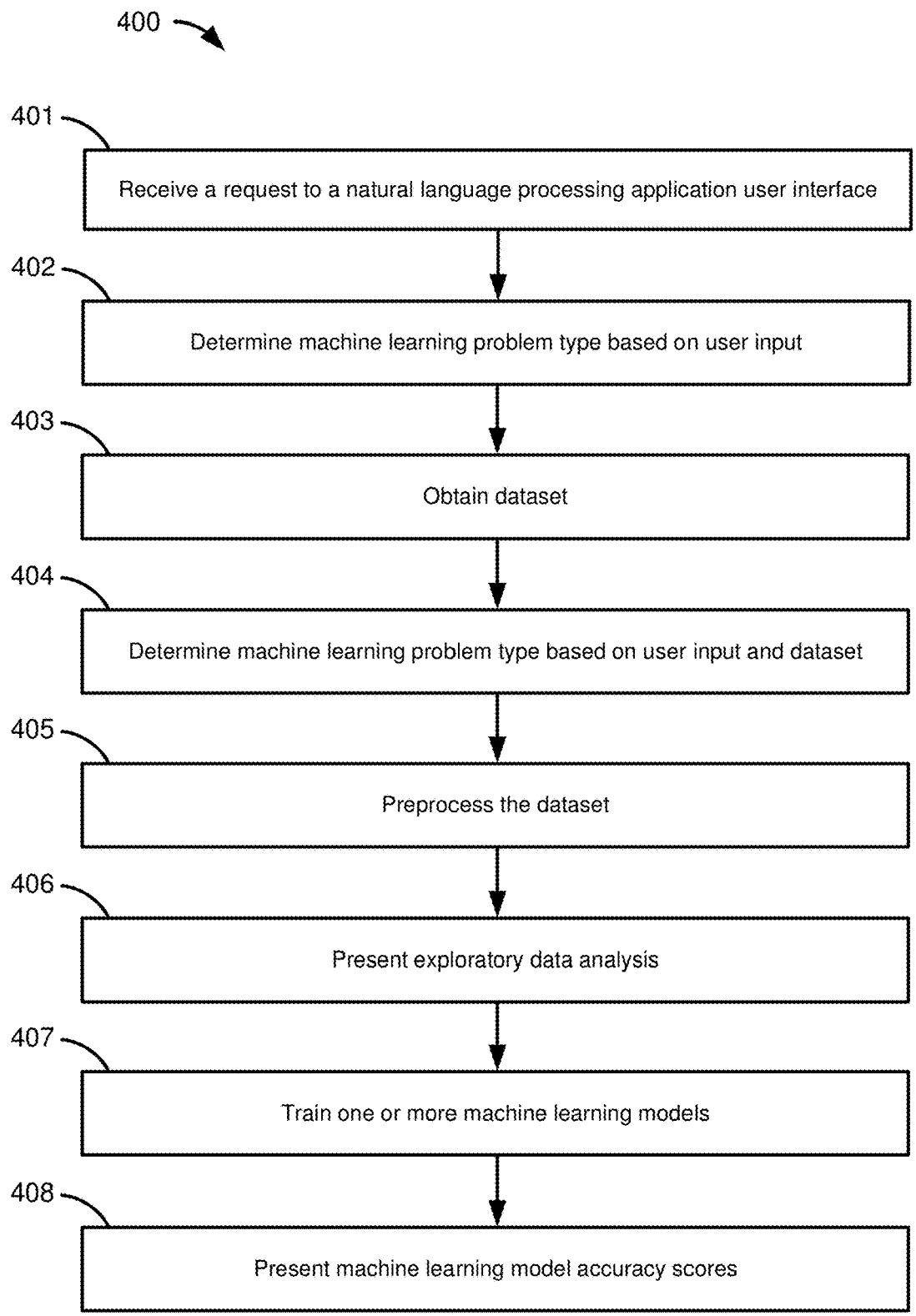
FIG. 4 shows a diagram of a process performed by a conversational automated machine learning software application, according to an embodiment.

FIG. 4 shows a diagram 400 of a process performed by a conversational automated machine learning software application, according to an embodiment. This process may be implemented using the functionality of the conversational automated machine learning software application described above with respect to FIG. 3 and it may be implemented by a conversational automated machine learning system as described herein.

At 401, the process receives a request to a natural language processing application user interface. The request may be to an NLP application user interface hosted as a service (e.g., running in the container) to build, train, and deploy a machine learning model. The user establish a connection to the application (e.g., after successful authorization and authentication) and the user may upload the Data Set in the application.

At 402, the process determines machine learning problem type (e.g., classification or regression) based on user input. Furthermore, based on the analysis type or a project name, all the generated artifacts are classified.

Figure 11:
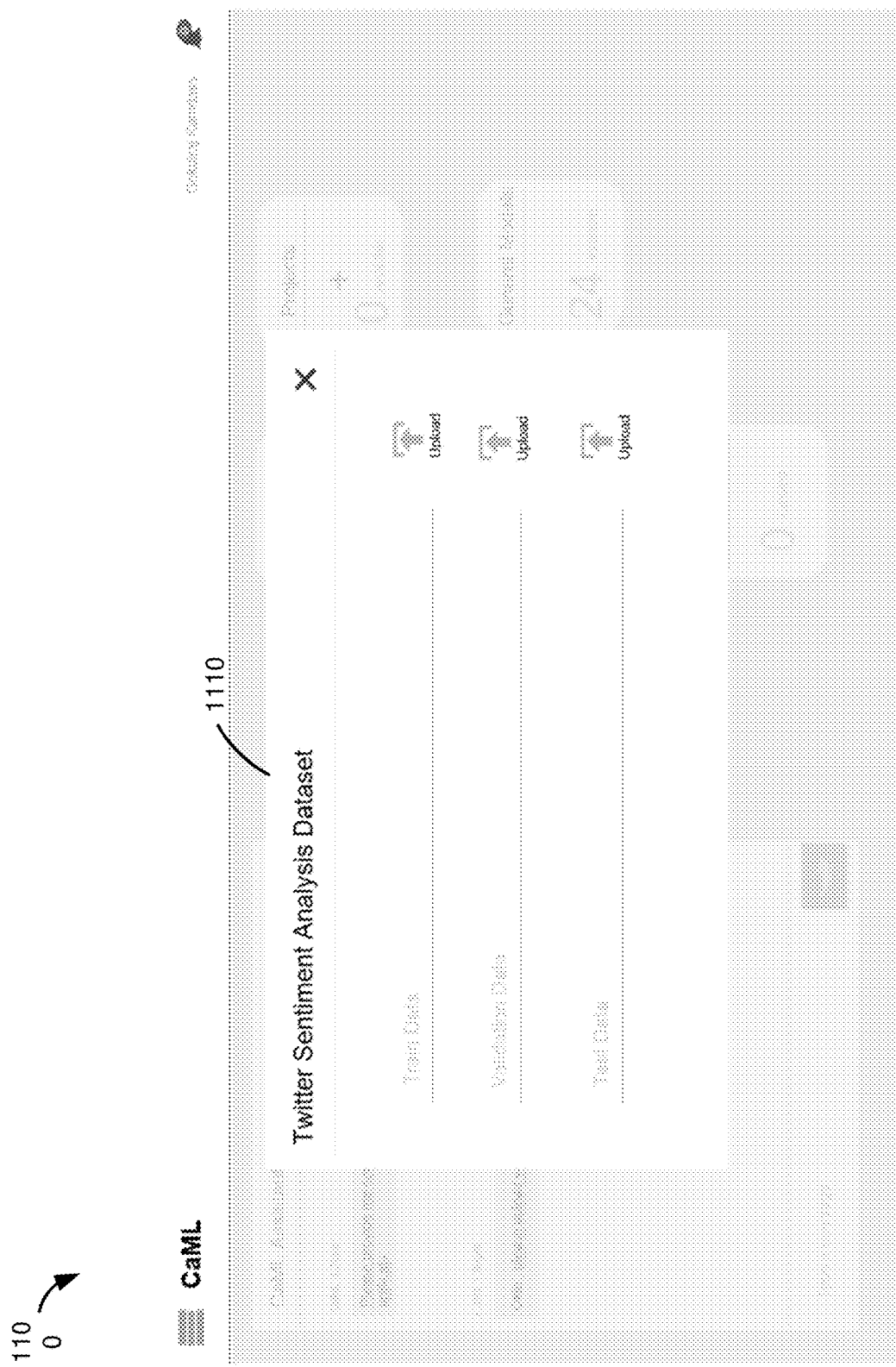
FIG. 11 shows a diagram of a dataset selection interface, according to an embodiment.

At 403, the process obtain dataset. The dataset may be selected by the user. The user may also provide validation data and test data for processing as described herein. An example user interface for selecting training data, validation data, and test data is shown in FIG. 11.

At 404, the process determines machine learning problem type based on user input and dataset. For instance, different machine learning algorithms may be better suited to different machine learning problem types, different analysis types, and different characteristics of datasets.

At 405, the process preprocesses the dataset. For example, when the dataset is uploaded the application triggers auto data preprocessing and it notifies the user when the specific step is completed. After completion, the next step of exploratory data analysis is triggered and completed based on the user request.

At 406, the process presents exploratory data analysis. The details of the exploratory data analysis are displayed with all the relevant details. An example of exploratory data analysis is shown in FIG. 14.

At 407, the process trains one or more machine learning models. The parameters may be automatically selected based on the problem type and the analysis type.

At 408, the process present machine learning model accuracy scores. The application may also recommend the model having the highest accuracy score, as further described herein.

Figure 5:
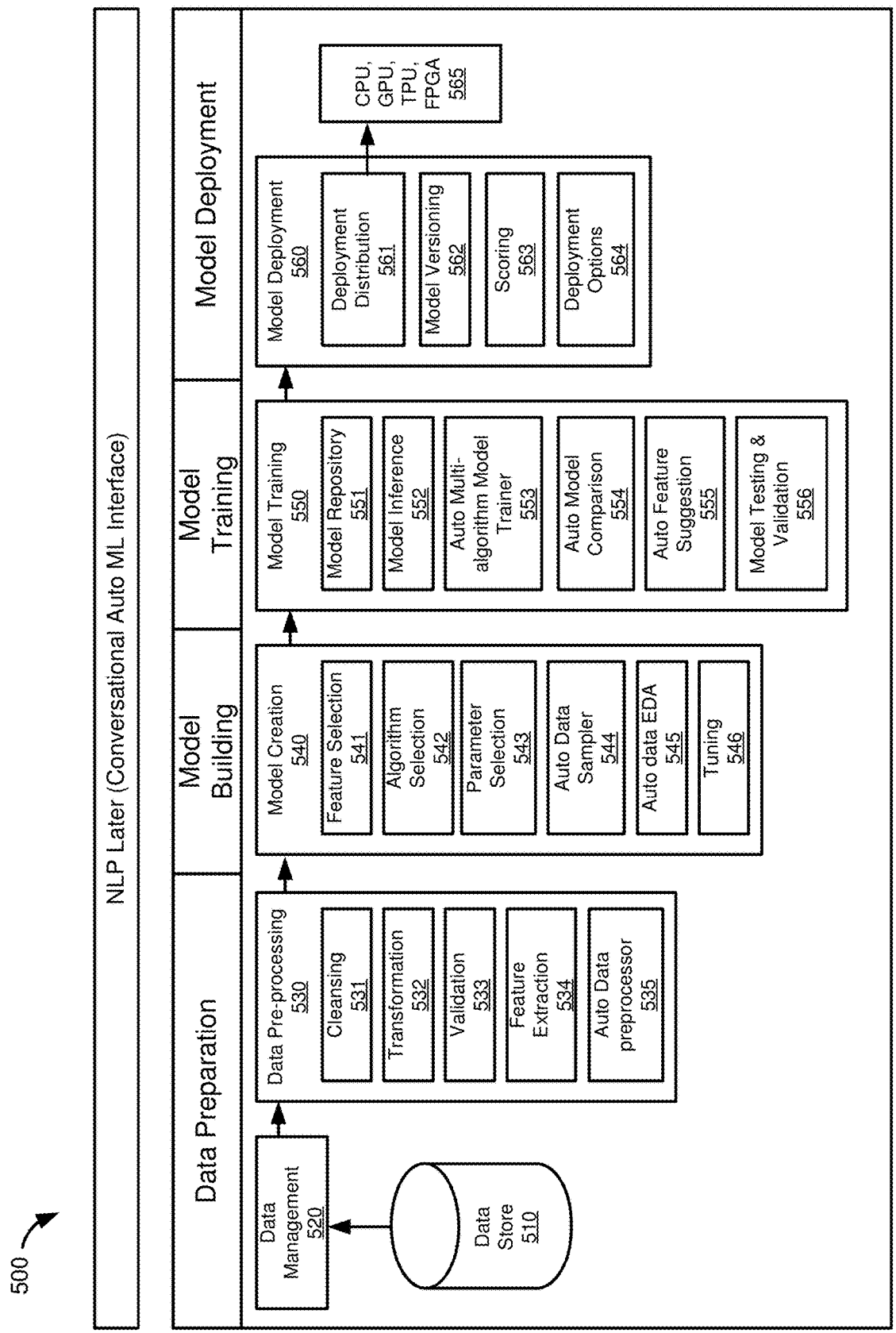
FIG. 5 shows a diagram of a sequence of steps that may be performed according to a routing slip, according to an embodiment.

As discussed above, a routing slip may be generated including a sequence of steps for training one or more machine learning models and determining the accuracy of the models. FIG. 5 shows a diagram 500 of a sequence of steps that may be performed according to a routing slip, according to an embodiment. The steps may be grouped as Data Preparation, Model Building, Model Training, and Model Deployment. The steps may be initiated, re-run, accessed, tracked, and managed via a natural language processing layer (e.g., conversational automated machine learning interface). The routing slip may be attached to the data set and it may specify data pre-processing steps 530, model creation steps 540, model training steps 550, and model deployment steps 560

Data preparation includes data management 520 in which a dataset is obtains from a datastore 510, which may be the data store of the conversational automated machine learning system, as described herein. The routing slip may be attached to the data set. For example, the dataset and the routing slip may be provided together in each step of the process, which may be performed by different services (e.g., using an API).

Data preparation also includes data preprocessing 530. The data pre-processing steps 530 include data cleaning 531, transformation 532, validation 533, feature extraction 534, and automated data preprocessing 535, for example.

Model building includes model creation 540 steps. Model creation 540 may include feature selection 541, algorithm selection 541, parameter selection 543, automated data sampler 544, automated data exploratory data analysis 545, and tuning 546, for example.

Model training includes model training steps 550. The model training steps 550 may include model repository 551, model interference 552, multi algorithm trainer 553, model comparison 554, feature suggestion 555, and testing and validation 556, for example.

Model deployment includes model deployment steps 560. The model deployment steps 560 may include deployment distribution 561, model versioning 562, scoring 563, and deployment options 564. Deployment distribution 561 may include deployment 565 to a central processing using (CPU), graphical processing using (GPU), tensor processing unit (TPU), or field-programmable fate array (FPGA), for example.

The steps performed according to the routing slip are further described below.

FIG. 6 shows a diagram 600 of an exemplary routing slip, according to an embodiment. In this example, the routing slip includes a sequence of steps 601, correlation IDs 602 corresponding to a particular step, and status codes 603 corresponding to a particular step. The sequence of steps 601 are the steps to be performed using a dataset to preprocess the data, generate a machine learning mode, and deploy the machine learning model. The correlation IDs 602 may be used as primary keys uniquely identifying the corresponding step. The status codes 603 may indicate whether the process has not started (i.e., the status code may not be set, may be empty, or blank), whether the process is in progress, and whether the process is completed.

The series of steps may be performed as a sequence. However, the user may request for already completed steps to be performed against using different parameters. For example, after reviewing the exploratory data analysis and selecting parameters, the user may decide that they want different features to be selected and they may request for the Feature Selection step to be performed again using the conversational interface. Thus, the user may request to go back to a particular processes in the routing slip. That particular step may be processed again and then the sequence of steps may continue.

As shown in FIG. 6, the steps 601 include a Cleansing step having a correlation IDS of 1000 and a status code of "completed," a Validation step having a correlation ID of 1010 and a status code of "completed," an Auto data pre-processing step having a correlation ID of 1020 and a status code of "completed," a Feature Selection step having a correlation ID of 1030 and a status code of "completed," an automated EDA step having a correlation ID of 1040 and a status code of "completed," a Parameters Selection step having a correlation ID of 1050 and a status code of "completed," a Tuning step having a correlation ID of 1060 and an empty or blank status code, a Model Training step having a correlation ID of 1070 and an empty or blank status code, a Model Validation step having a correlation ID of 1080 and an empty or blank status code, a model versioning step having a correlation ID of 1090 and an empty or blank status code, and a Model Deployment step having a correlation ID of 1100 and an empty or blank status code.

As discussed herein, these steps will be performed in the sequence indicated by the routing slip and the status of each step may be tracked in the routing slip. Accordingly, the data and the attached routing slip are passed to the different services in the appropriate order and conversational dialog (e.g., initiation parameters, status, results etc.) regarding each step may be presented to the user.

Figure 7:
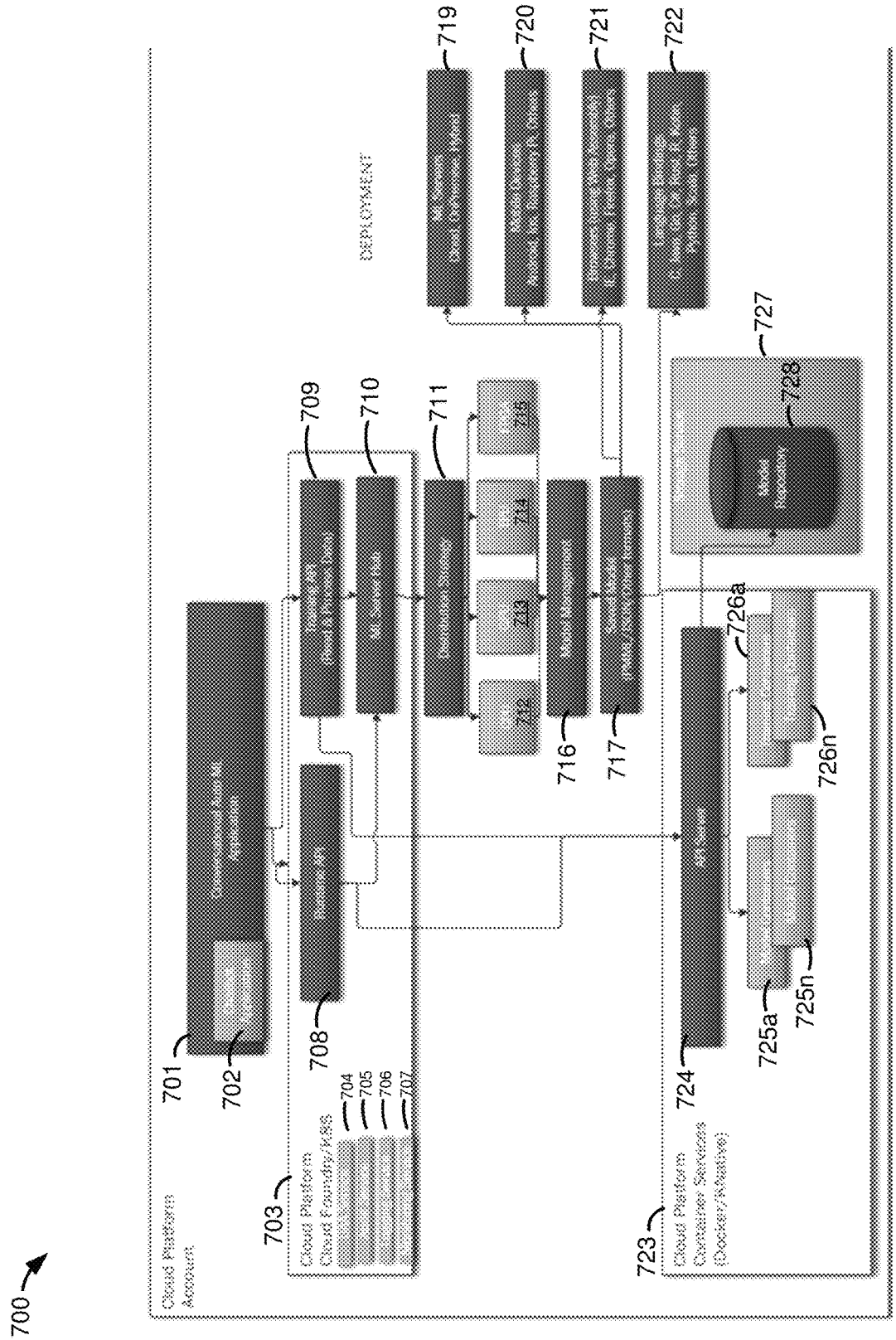
FIG. 7 shows an architectural diagram of a conversational automated machine learning system, according to an embodiment.

FIG. 7 shows an architectural diagram 700 of a conversational automated machine learning system, according to an embodiment. The conversational automated machine learning system including the conversational automated machine learning (CaML) application 701, as described herein, which includes a chatbot application 702.

The conversational automated machine learning system may be implemented on a cloud platform foundry 703 and may use a cloud platform account. The cloud platform foundry 703 may include a user account and authentication (UAA) service 704, an audit service 705, a logging service 706, and a monitoring service 708. The cloud platform 703 may provide a runtime application programming interface (API) 708 and a training API 709 that may be accessed by the CaML application 701. The training API 709 may provide reading and processing of a dataset. The processed dataset may be provided to a machine learning (ML) server hub 710, which may train machine learning models as described herein.

The machine learning models trained by the ML server hub 710 may be prepared for distribution by a distribution strategy service 711 which may provide machine learning models for deployment to a central processing unit (CPU) 712. a graphics processing unit (GPU) 713, a tensor processing unit (TPU) 714, or a field-programmable gate array (FPGA) 715. The models for the different deployments may be managed by a model management service 716. These models may be saved in different formats by a saved model service 717, such as Predictive Model Markup Language (PMML), JavaScript Object Notation (JSON), or other formats, for example. These models may be deployed or implemented on machine learning servers 719 (e.g., cloud servers, on-premise servers, or hybrid servers), on mobile devices 720, web browsers 721, using web assembly for example, or language bindings (e.g., C, Java, Go, C#, Rust, R, Kotin, Python, Scala, and others).

A cloud platform container service 723 may include an API server 724 that includes one or more model containers 752*a-n* and training containers 726*a-n*. The API server 724 may access a model repository 728 of a storage service 727.

The architecture describes above is scalable by attaching different ML Servers (e.g., TensorFlow, R, Different Python Server Flavors etc.,) as part of a databases (e.g., HANA, PostgreSQL, etc.). Each attached ML server may scale independently and on-demand. Each ML server instance may host different libraries, procedures, algorithms. For example, each TensorFlow server may potentially runs different procedures/libraries. The attached ML servers may be upgraded independently from the database server and from the other ML Servers and without downtime, thereby supporting high availability options.

This architecture may support leveraging heterogeneous database node architecture. For example, each node may have a different setup for the attached ML servers. The attached ML servers may run on different CPU types, GPU types, TPU types, FPGA types, etc., for example. An attached ML server configuration and deployment option may integrate with both cloud and on-premise deployments. Options are also provided to run in a Cloud or On-premise or a Hybrid Environment, for example.

As mentioned above, this architecture supports different distribution strategies based on context and use case. For example, the execution is supported by CPU, GPU, TPU, FPGA, etc., for example. The architecture also provides options to export saved models in different data formats like PMML, JSON, different Python formats etc. The architecture also provides options to run the ML Model in different mobile devices (e.g., based on Android, IOS, Raspberry PI, RTOS, etc.). The architecture also provides options to run the ML Model in different Browsers using the Web Assembly formats, for example. The architecture also provides options to run with different Language Bindings like C, Java, Go, C#, Rust, R, Kotin, Python, Scala, etc., for example. The architecture also provides load balancing across multiple different ML Model Servers and may provide for zero-downtime upgrades/changes of models, model versions, and ML Model Server versions along with end-to-end encryption, in some embodiments.

Figure 8:
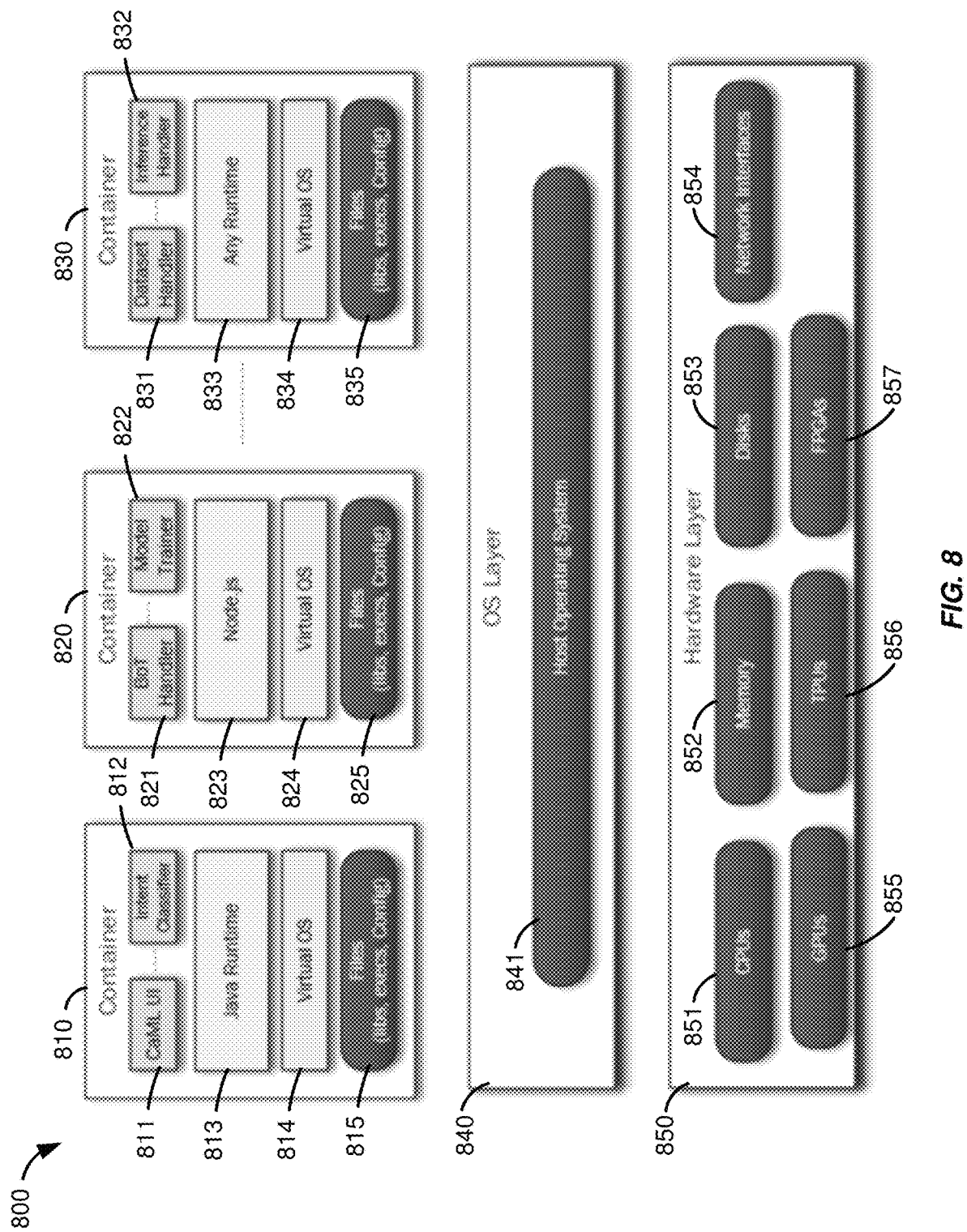
FIG. 8 shows a diagram of infrastructure used in deploying the a conversational automated machine learning application, according to an embodiment.

FIG. 8 shows a diagram 800 of infrastructure used in deploying the a conversational automated machine learning application, according to an embodiment. Each of the different components of the conversational automated machine learning (CaML) system may run as different API's (e.g., REST APIs created in Python). Each of the different components of the CaML system may be deployed in different containers. For example, services such as the BoT Configurator, BoT Handler, Notification Handler, etc., may be different Node.js (i.e., JavaScript runtime environment) services deployed in different containers.

As shown in FIG. 8, a CaML UI 811 and intent classifier 812 component may be deployed in a first container 810, which includes a java runtime 813, a virtual operating system 814, and files 815 (e.g., libraries, executables, and configuration files). A separate second container 820 may provide the BoT handler 821 and the model trainer 822. These services may be provided by a Node.js environment 823. The second container 820 may also include a virtual operating system 824 and files 825 (e.g., libraries, executables, and configuration files). A separate third container 830 may provide the dataset handler 813 and the interface handler 832. The third container 830 may also be implemented using any other appropriate runtime environment 833, for example. The third container 830 may include a virtual operating system 834 and files 835 (e.g., libraries, executables, and configuration files).

In addition, the infrastructure may also include an operating system layer 840 and a hardware layer 850. The operating system layer 840 may include a host operating system 841. The hardware layer 850 may include CPUs 851, memory 852, disks 853, network interface 854, GPUs 855, TPUs 856, and FPGAs 857.

In some embodiments, infrastructure hook may bind the cloud or on-premise infrastructures with database nodes which provide the database servers and the different attached machine learning servers. In some embodiments, the infrastructure may include multiple database nodes that may bind with multiple cloud and on-premise infrastructures using multiple infrastructure hooks.

In some embodiments, the infrastructure may include runtime model management that provides for the models to be added and removed on-the-fly from running ML server instances. Similarly, the ML server instances (e.g., TensorFlow Servers, R Servers etc.) may also be added and removed on the fly.

In some embodiments, the infrastructure may include design time and runtime layers that are different, thereby providing elasticity, resilience, performance, and the ability to scale-up/scale out independently. The design time layers may store different data differently, such as historical data stored on disk and tapes, operational data stored in memory, experience data stored in memory, and sensor data and internet of things (IoT) data stored in data lakes, for example.

In some embodiments, runtime layer may hold compute components and perform query compilation, query optimization, query execution, analytics, prediction, etc. The runtime layer may provide for governance, data object isolation, access control, etc. This may also provide for resource isolation along with technical independence for self-scaling and for independent software updates without impacting the different systems in an enterprise landscape.

FIGS. 9-19 show exemplary user interfaces that may be provided by a conversations automated machine learning system as described herein.

Figure 9:
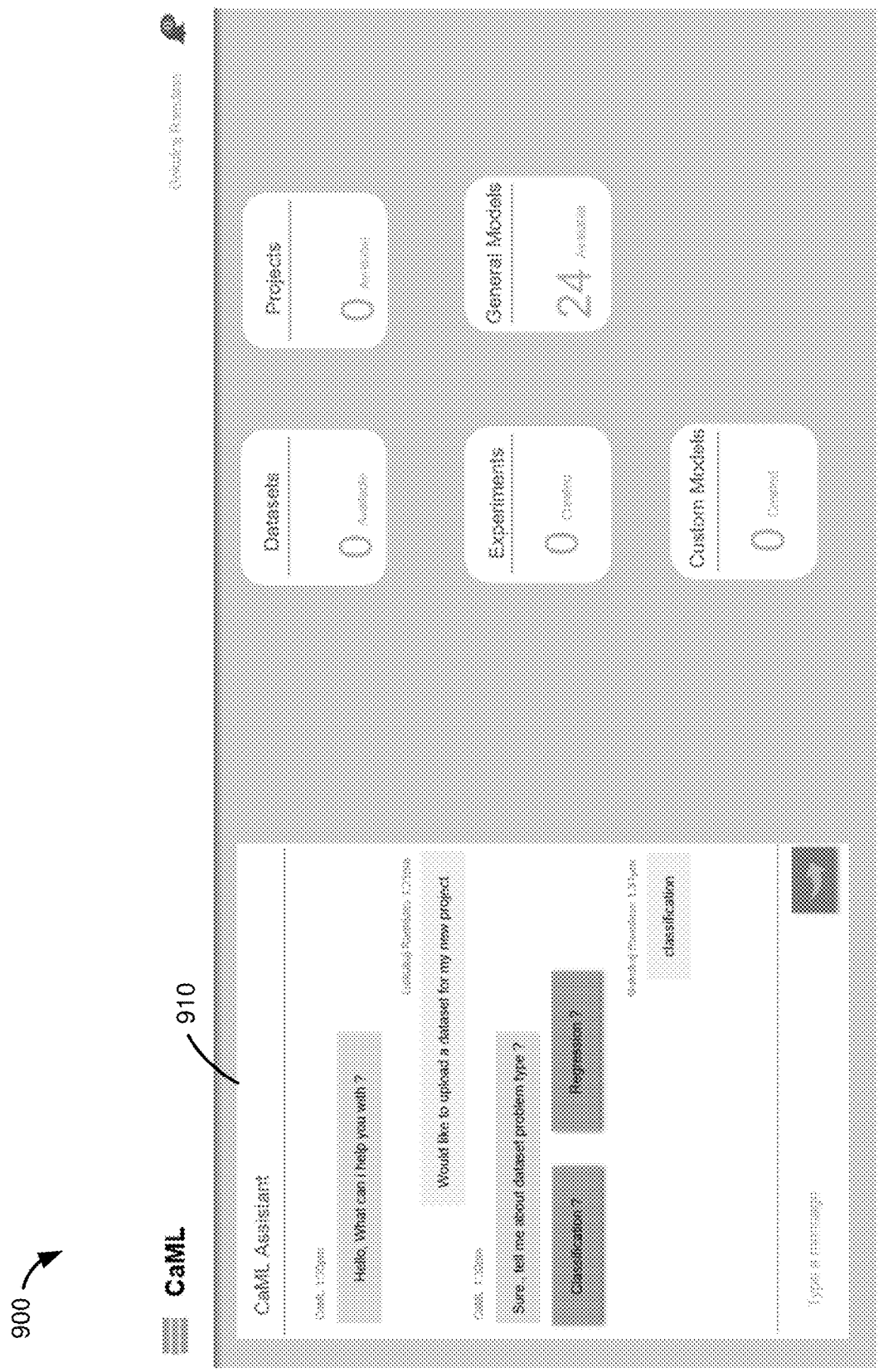
FIG. 9 shows a diagram of a conversational user interface querying the user regarding the machine learning problem type, according to an embodiment.

FIG. 9 shows a diagram 900 of a conversational user interface 910 querying the user regarding the machine learning problem type, according to an embodiment. As shown in FIG. 9, a chat bot may prompt a user and the user may request to upload a dataset for a new project (i.e., a machine learning project). Then the chat bot may ask the user to provide further details about the dataset problem type to be solved using machine learning (e.g., is the problem a classification type problem or a regression type problem). In this example, the user selects a classification type problem. This diagram 900 may show the initial user interface shown when the user first accesses the CaML system.

As shown on the right-side of the user interface, the CaML system may currently have 0 data sets, 0 projects, 0 experiments, 24 general models (e.g., available machine learning algorithms), and 0 custom models. Once the user selects a dataset, a project may be created for that dataset. The project may have one-to-one correspondence with the data set. The generation of a set of one or more machine learning models are saved as experiments, which are associated with the project. The general models may be provided with the CaML system. The user may also upload custom models.

Figure 10:
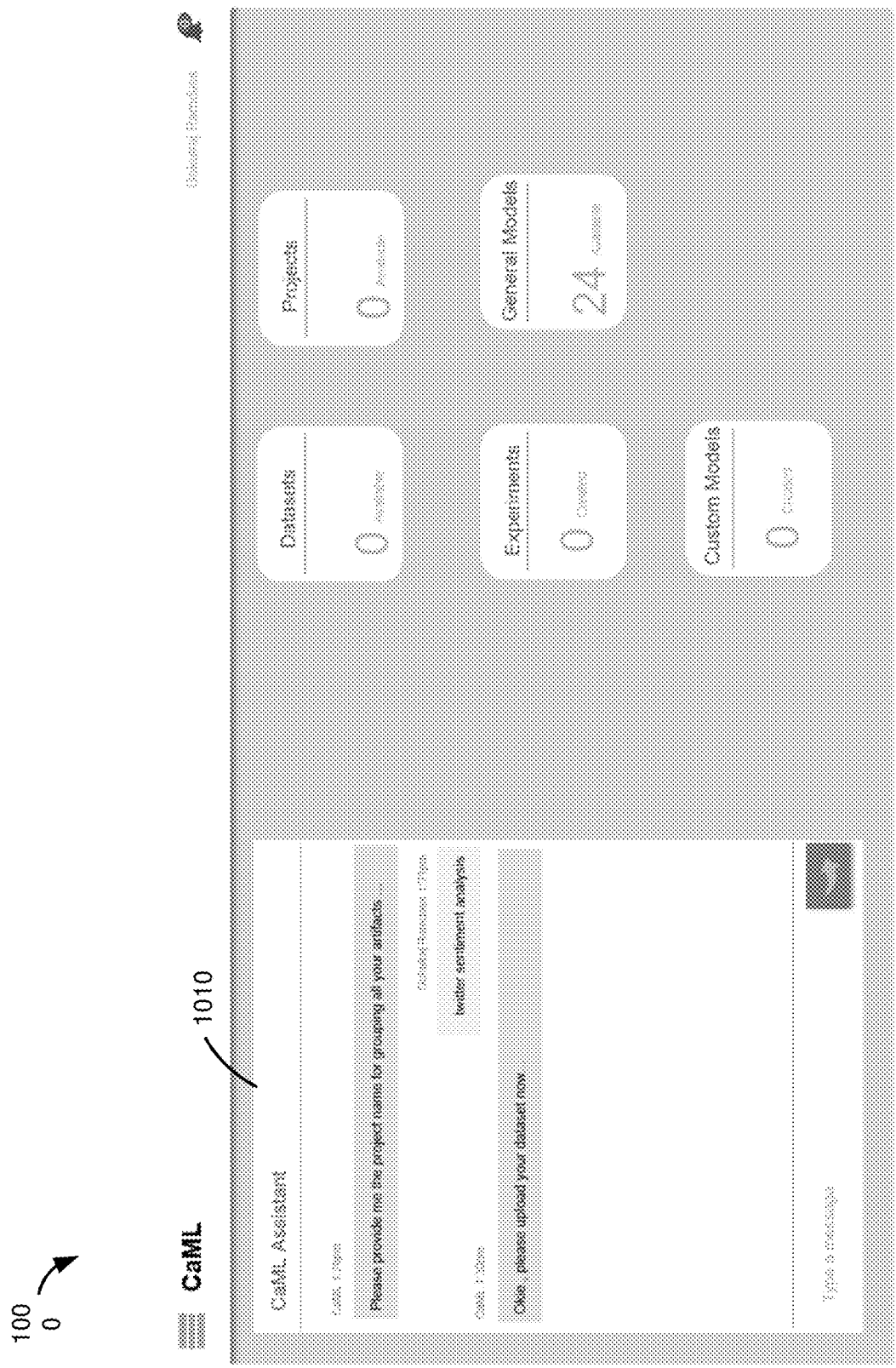
FIG. 10 shows a diagram of a conversational user interface notifying the user regarding a dataset selection, according to an embodiment.

FIG. 10 shows a diagram 1000 of a conversational user interface 1010 notifying the user regarding a dataset selection, according to an embodiment. The user interface shown in diagram 1000 may continue from the user interface of diagram 900 described above.

In this example, the chat bot requests the user to provide a project name. The project name may indicate the analysis type to be performed using the machine learning models that are to be generated by the CaML system. In this example, the user states "twitter sentiment analysis." Therefore, the analysis type may be sentiment analysis. Next, the chat bot requests the user to upload their dataset to be used for training, validating, and testing. the machine learning models.

FIG. 11 shows a diagram 1100 of a dataset selection interface, according to an embodiment. The user interface shown in diagram 1100 may continue from the user interface of diagram 1000 described above. In this example, the user interface provides a popup window 1110 with prompts for the user to select three different data sets, a training data set, a validation data set, and a test data set.

Figure 12:
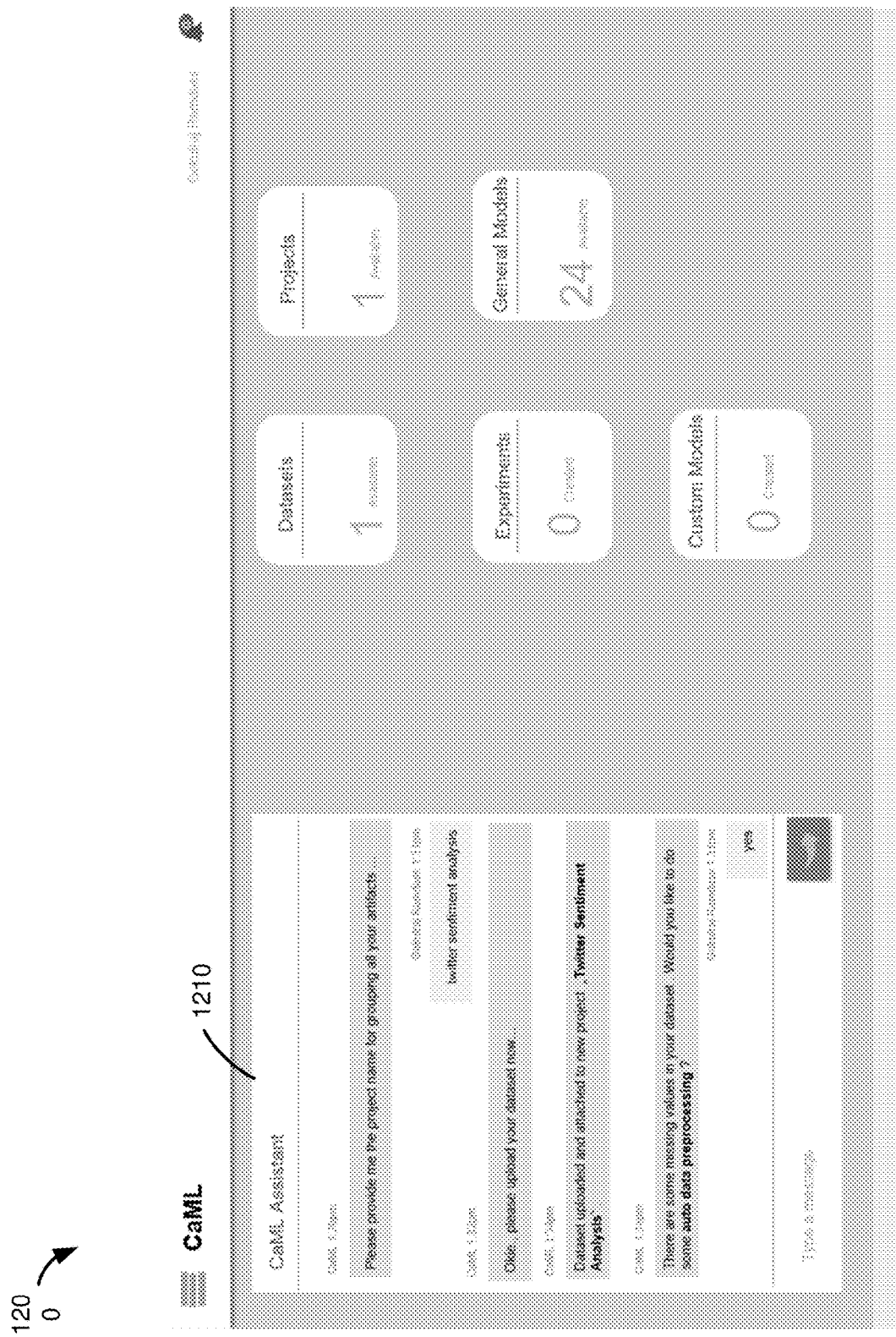
FIG. 12 shows a diagram of a conversational user interface querying the user regarding data preprocessing, according to an embodiment.

FIG. 12 shows a diagram 1200 of a conversational user interface 1210 querying the user regarding data preprocessing, according to an embodiment. The user interface shown in diagram 1200 may continue from the user interface of diagram 1100 described above. After the datasets have been uploaded the chat bot may notify the user that the dataset has been upload and the user interface shows 1 dataset (i.e., the user uploaded data for training, validation, and testing) and 1 project (i.e., the twitter sentiment analysis project). After the dataset is uploaded, the CaML system may automatically generate a routing slip as described above.

Referring back to FIG. 6, the three steps in the routing slip may be cleansing of the dataset and validation of the dataset. For example, the CaML system may automatically cleanse the dataset and then validate the dataset to determine whether there are missing values. In this example there are missing values in the uploaded dataset (e.g., particular records in the dataset may be missing values for certain features) and the chat bot asks the user whether they want to perform automatic data preprocessing. For example, the data may be cleansed and preprocessed before EDA or training. In this example, the user may decide to have the data automatically preprocessed. Features for use in training the machine learning model may then be selected based on the preprocessed data. Referring back to FIG. 6, at this point the routing slip may indicate that the status for cleansing, validation, auto data preprocessing, and feature selection are "completed" while the other steps may have empty to blank status codes.

Figure 13:
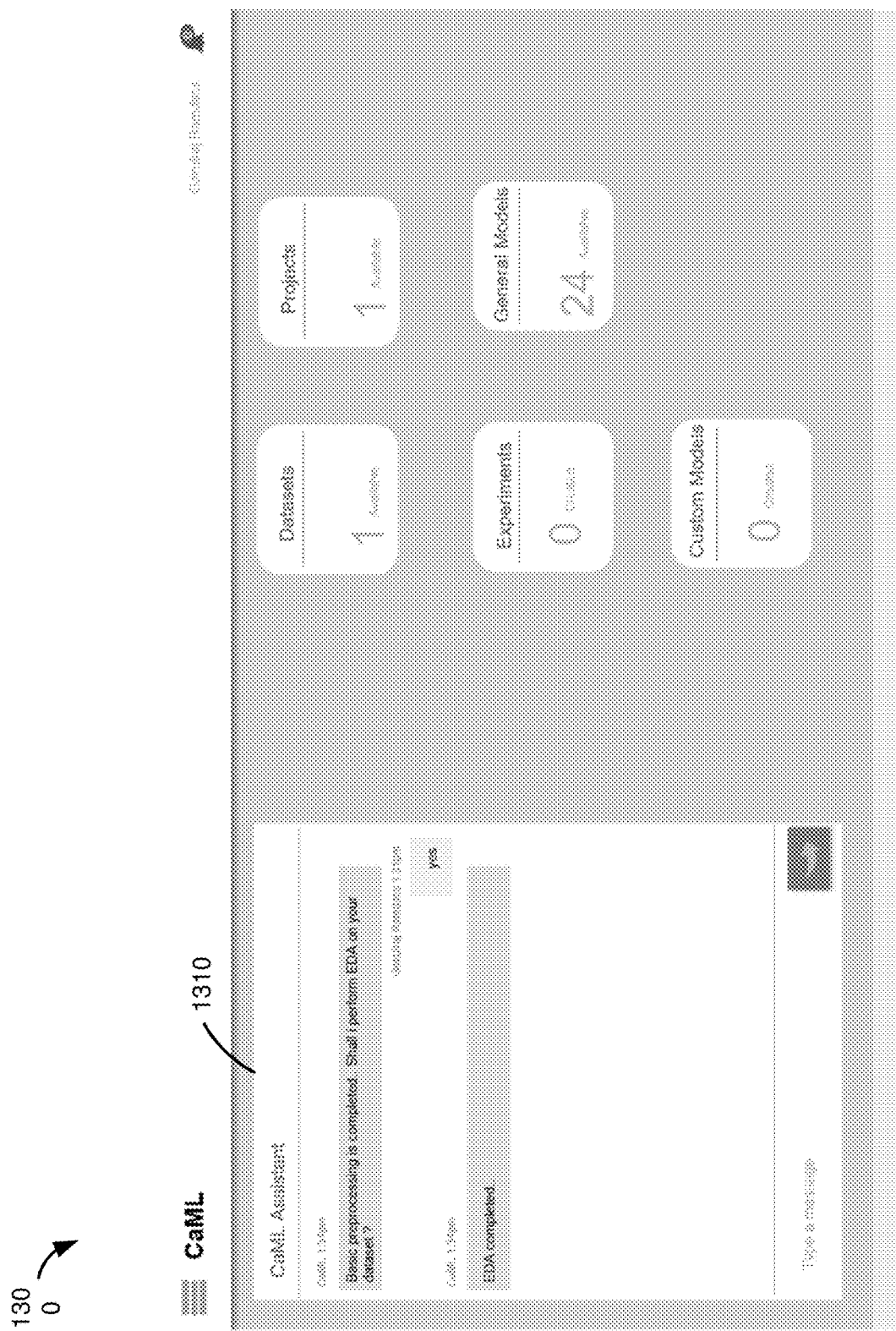
FIG. 13 shows a diagram of a conversational user interface querying the user regarding exploratory dataset analysis, according to an embodiment.

FIG. 13 shows a diagram 1300 of a conversational user interface 1310 querying the user regarding exploratory dataset analysis, according to an embodiment. The user interface shown in diagram 1300 may continue from the user interface of diagram 1200 described above. After the data has been preprocessed and the features selected, the chat bot may notify the user that preprocessing is completed and then ask the user whether they may to perform EDA on the dataset. In this example the user states "yes" and so EDA is performed and then the chat bot notifies the user when EDA is completed. When EDA is completed, the status for EDA will be updated in the routing slip.

FIG. 14 shows a diagram 1400 of an interface presenting the exploratory data analysis, according to an embodiment. The user interface shown in diagram 1400 may continue from the user interface of diagram 1300 described above. This user interface shows an example of information determined using exploratory data analysis. In this example, the exploratory data analysis shows that the dataset includes 4 variable and 150 observations, where 3 of the variables are numeric and 1 is rejected. The first variable "0" is numeric and has 35 distinct counts with a mean of 5.8433, the second variable "1" is numeric and has 23 distinct counts with a mean of 3.0573, and the third variable "2" is numeric and has 43 distinct counts with a means of 3.758. In this example, there is a warning that the fourth variable "3" is highly correlated with variable "2" and so this variable is rejected or ignored for the analysis. Other information and statistics on the dataset may be determined and presented as part of exploratory data analysis.

Figure 15:
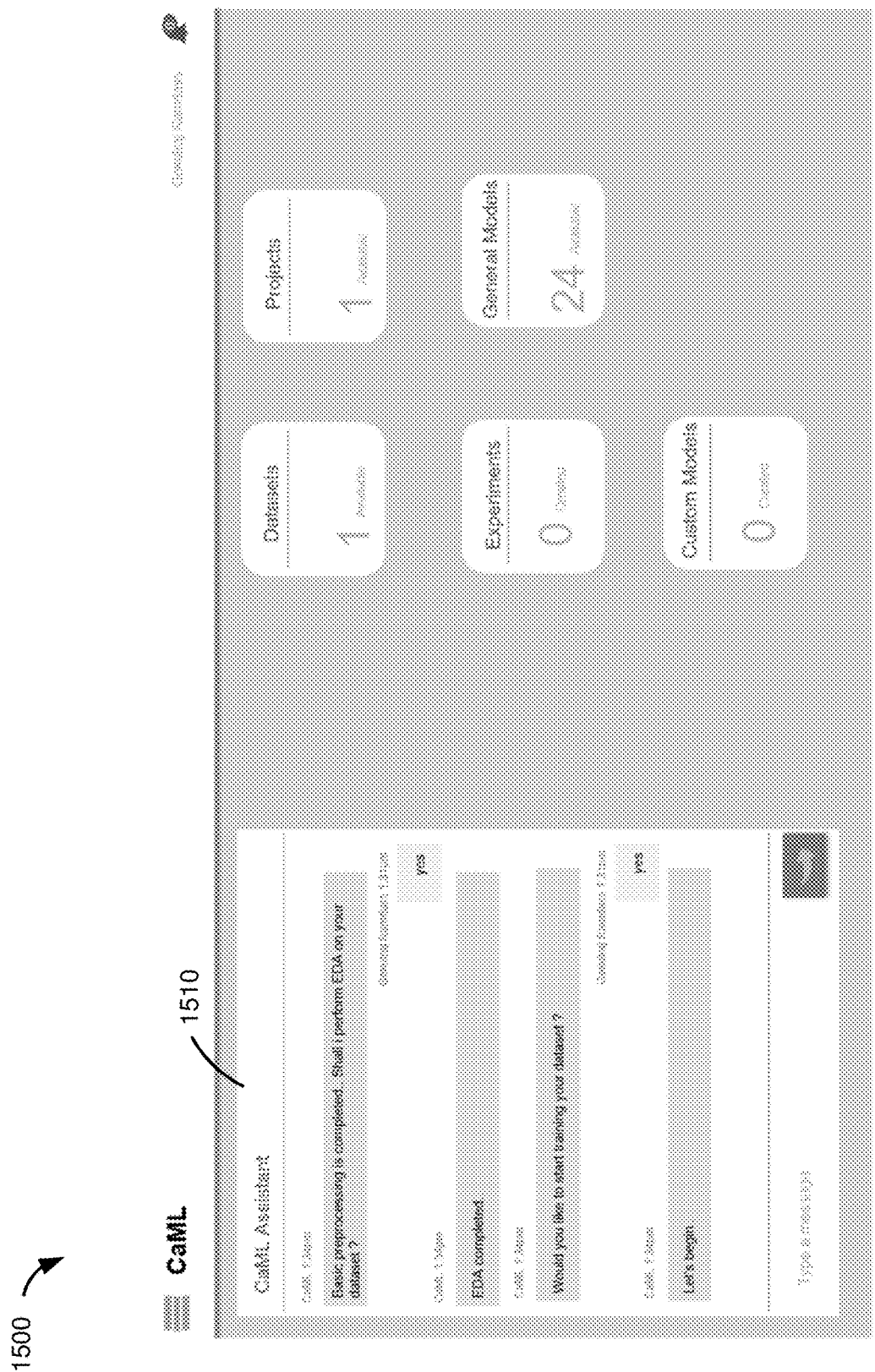
FIG. 15 shows a diagram of a conversational user interface querying the user regarding training of a machine learning model, according to an embodiment.

FIG. 15 shows a diagram 1500 of a conversational user interface 1510 querying the user regarding training of a machine learning model, according to an embodiment. The user interface shown in diagram 1500 may continue from the user interface of diagram 1400 described above. After the user has reviewed the exploratory data analysis, the chat bot may ask the user whether they want to train the dataset. In this example, the user states "yes" and the chat bot notifies the user that training has begun. At this point, the status in the routing slip for model training may be set to "in progress."

FIG. 16 shows a diagram 1600 of a conversational user interface 1610 querying the user regarding machine learning algorithm selection, according to an embodiment. The user interface shown in diagram 1600 may continue from the user interface of diagram 1500 described above. In this example, the chat bot may ask the user whether they want the CaML system to perform automated machine learning or if the user wants to manually select machine learning algorithms. In this example, the user selects manual. However, if the user is not experienced with machine learning algorithms, they may decide to select automated machine learning. This example is provided for the illustrative purpose of showing the user interface of FIG. 17.

FIG. 17 shows a diagram 1700 of a user interface 1710 for selecting types of machine learning models to be generated, according to an embodiment. The user interface shown in diagram 1700 may continue from the user interface of diagram 1600 described above. As shown in FIG. 17, the user may select from three machine learning algorithms: random forest classifier, decision tree classifier, and ada boost classifier. In this example the ada boost classifier may be deselected. In the user interface 1710 the user may also select a type of metric (e.g., accuracy) and graphics (e.g., a confusion matrix) to be presented for the machine learning models.

Figure 18:
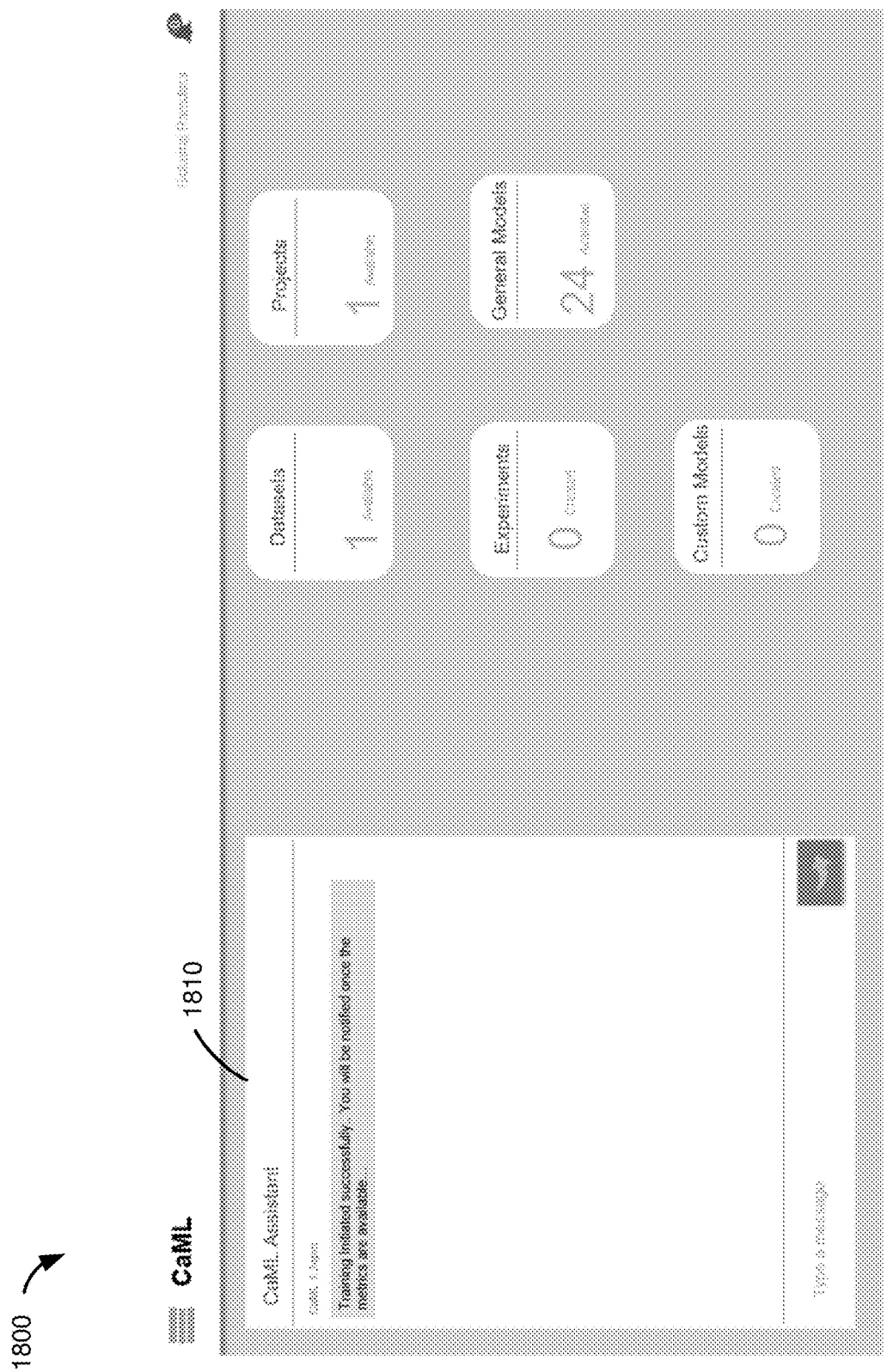
FIG. 18 shows a diagram of a conversational user interface notifying the user regarding training, according to an embodiment.

FIG. 18 shows a diagram 1800 of a conversational user interface 1810 notifying the user regarding training, according to an embodiment. The user interface shown in diagram 1700 may continue from the user interface of diagram 1600 described above. After the machine learning models are automatically selected or manually selected, training, validating, and testing of the models may be performed using the dataset. In the user interface 1810, the chat bot notifies the user that training has initiated successfully and that the user will be notified when metrics are available. At this point, the routing slip will have been updated to indicate that parameter selected and tuning are completed and that model training is in progress.

FIG. 19 shows a diagram 1900 of a conversational user interface 1910 providing accuracy scores for two machine learning models, according to an embodiment. The user interface shown in diagram 1900 may continue from the user interface of diagram 1800 described above. After training, validation, and testing of the machine learning models is performed, metrics such as accuracy scores may be determined. In other embodiments other metrics may be determined (e.g., as selected in the manual selection interface of FIG. 17). In this example, the chat bot notifies the user that the analysis has been completed and provides accuracy scores for each of the models: 92.3% accuracy for the random forest model and 90.5% accuracy for the decision tree model. The chat bot also provides a recommendation to use the random forest classifier algorithm for training of machine learning models for the dataset.

From here, the user may decide to use the model for inference of new data. In some cases, the accuracy may not be acceptable to the user and they may device to change parameters of the process. The user may use the chat interface to return to a previous step of the process (as indicated in the routing slip) and perform a new "experiment" on the dataset using different parameters.

Thus, a user that is not a data scientist and that does not have experience training machine learning models may interact with the chat bot of the CaML system to build accurate machine learning models. Features and advantages of conversational automated machine learning is that it enables a new class of "citizen data scientists" (e.g., domain experts without machine learning expertise) with the power to create advanced machine learning models, all without having to learn to code or understand the differences between different machine learning algorithms. Furthermore, data scientists may be more productive as repetitive steps in the model building process are automated, allowing them to use their unique expertise for selecting and fine-tuning models. Automated machine learning may replace much of the manual work required by a more traditional data science process. The conversational automated machine learning techniques described herein also provide for automatic data collection and filtering, diverse options for configuration, analysis and visualization, continuous and automated analysis of models, enables developers with limited machine learning expertise to train high-quality models specific to their needs, achieves faster performance and more accurate predictions with the machine learning models, and provides conversational user interface to train, evaluate, improve, and deploy models based on a selected dataset.

Figure 20:
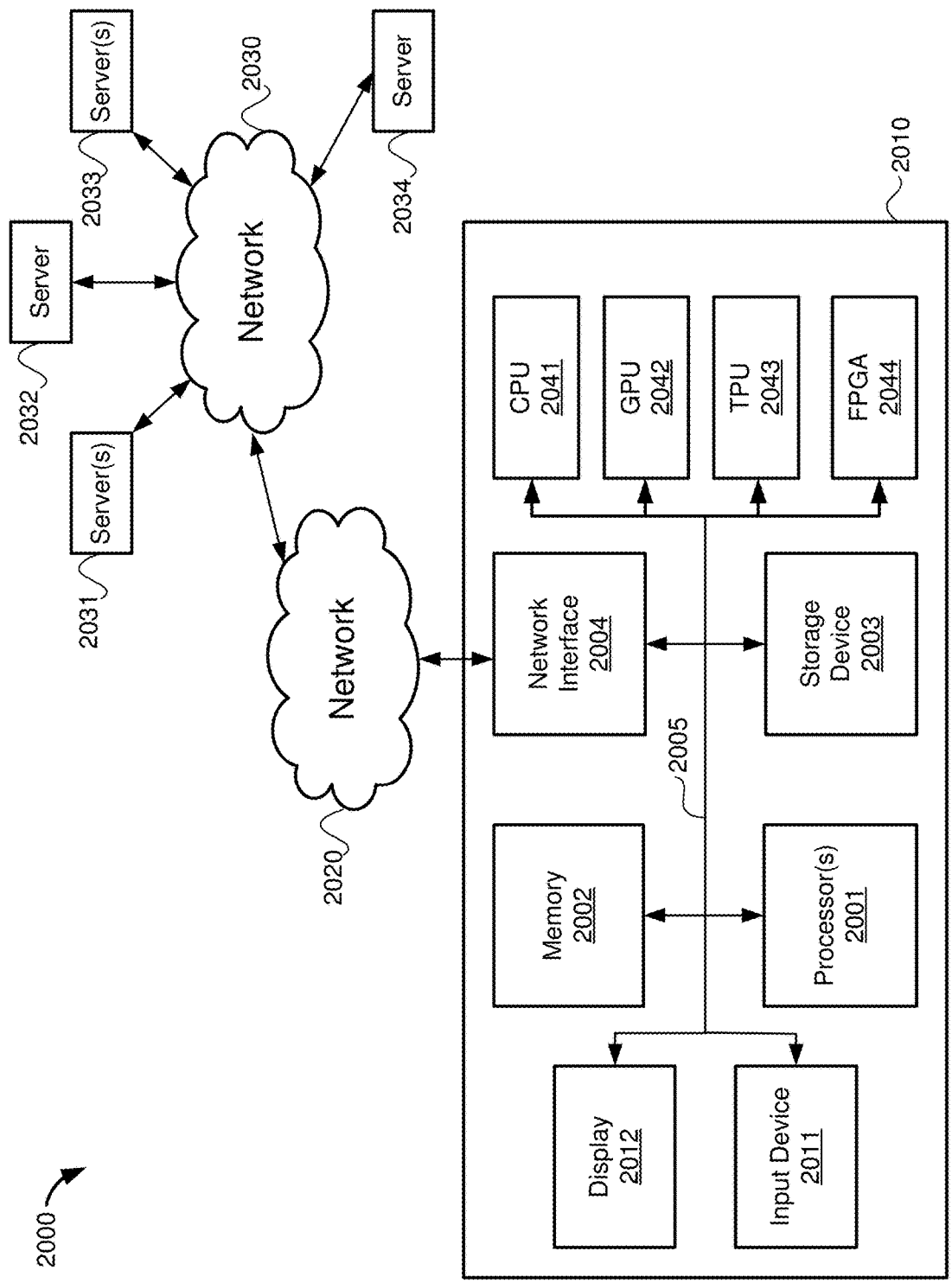
FIG. 20 shows a diagram of hardware of a special purpose computing machine for implementing systems and methods described herein.

FIG. 20 shows a diagram 2000 of hardware of a special purpose computing machine for implementing the conversational automated machine learning systems and methods described herein. A computer system 2010 includes a bus 2005 or other communication mechanism for communicating information, and one or more processors 2001 coupled with bus 2005 for processing information. The computer system 2010 also includes a memory 2002 coupled to bus 2005 for storing information and instructions to be executed by processor 2001, including information and instructions for performing some of the techniques described above, for example. This memory may also be used for storing programs executed by processor(s) 2001. Possible implementations of this memory may be, but are not limited to, random access memory (RAM), read only memory (ROM), or both. A storage device 2003 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 2003 may include source code, binary code, or software files for performing the techniques above, such as the processes described above, for example. Storage device and memory are both examples of non-transitory computer readable storage mediums.

The computer system 2010 may be coupled via bus 2005 to a display 2012 for displaying information to a computer user. An input device 2011 such as a keyboard, touchscreen, and/or mouse is coupled to bus 2005 for communicating information and command selections from the user to processor 2001. The combination of these components allows the user to communicate with the system. In some systems, bus 2005 represents multiple specialized buses, for example.

In some embodiments, the computer system 2010 may also one or more processors for used for deploying the machine learning model. These one or more processors may include a central processing using (CPUI) 2041, a graphics processing unit (GPU) 2042, a tensor processing unit (2043), and a field-programmable gate array (2044) configured to implement the machine learning models described herein. In some embodiments, the processors for deploying the machine learning model may implemented in another system external to the computer system 2010.

The computer system also includes a network interface 2004 coupled with bus 2005. The network interface 2004 may provide two-way data communication between computer system 2010 and one or more networks, such as a first network 2020 and a second network 2030. The network interface 2004 may be a wireless or wired connection, for example. The computer system 2010 can send and receive information through the network interface 2004 across one or more of local area networks, Intranets, cellular networks, or the Internet, for example. In the Internet example, a browser, for example, may access data and features on backend systems that may reside on multiple different hardware servers 2031-2034 across the network. The servers 2031-2034 may be part of a cloud computing environment, for example.

ADDITIONAL EMBODIMENTS

Additional embodiments of the present disclosure are further described below.

One embodiment provides a computer system comprising one or more processors. The computer system further comprises one or more machine-readable medium coupled to the one or more processors and storing computer program code comprising sets of instructions executable by the one or more processors. The sets of instructions are executable to identify a dataset based on a user selection. The sets of instructions are further executable to determine a machine learning problem type and an analysis type based on user input provided to a conversational interface. The sets of instructions are further executable to determine one or more machine learning algorithms based on the dataset, the machine learning problem type, and the analysis type. The sets of instructions are further executable to generate a routing slip for each of the one or more machine learning algorithms based on the dataset, the machine learning problem type, and the analysis type. Each routing slip specifies a sequence of processing steps based on the dataset and a particular machine learning algorithm. The sequence of processing steps includes a machine learning parameter selection step and a machine learning model training step. The sets of instructions are further executable to perform the sequence of processing steps specified in the routing slip for each of the one or more machine learning algorithms to generate one or more machine learning models. The machine learning model training step generating a machine learning model using parameters selected in the machine learning parameter selection step. The sets of instructions are further executable to determine an accuracy score for each of the one or more machine learning models. The sets of instructions are further executable to present the accuracy score for each of the one or more machine learning models to the user via the conversational interface.

In some embodiments of the computer system, the performing the sequence of processing steps specified in the routing slip for each of the one or more machine learning algorithms includes attaching the routing slip for each of the one or more machine learning algorithms to the dataset and successively routing the dataset to a plurality of microservices specified in a routing table.

In some embodiments of the computer system, the computer program code further comprises sets of instructions executable by the one or more processors to track a status of each of the sequence of processing steps in the routing slip and notify the user via the conversational interface of the status of each of the sequence of processing steps as the processing steps are performed.

In some embodiments of the computer system, the computer program code further comprises sets of instructions executable by the one or more processors to analyze the dataset to identify data preprocessing steps that may be performed and query the user via the conversational interface as to whether preprocessing of the dataset should be performed based on the analysis of the dataset.

In some embodiments of the computer system, the determination of the one or more machine learning algorithms is further based on a size of the dataset and a number of variables in the dataset.

In some embodiments of the computer system, the machine learning problem type includes a classification problem type or a regression problem type.

In some embodiments of the computer system, the analysis type comprises sentiment analysis.

Another embodiment provides one or more non-transitory computer-readable medium storing computer program code. The computer program code comprising sets of instructions to identify a dataset based on a user selection. The computer program code further comprising sets of instructions to determine a machine learning problem type and an analysis type based on user input provided to a conversational interface. The computer program code further comprising sets of instructions to determine one or more machine learning algorithms based on the dataset, the machine learning problem type, and the analysis type. The computer program code further comprising sets of instructions to generate a routing slip for each of the one or more machine learning algorithms based on the dataset, the machine learning problem type, and the analysis type. Each routing slip specifies a sequence of processing steps based on the dataset and a particular machine learning algorithm. The sequence of processing steps includes a machine learning parameter selection step and a machine learning model training step. The computer program code further comprising sets of instructions to perform the sequence of processing steps specified in the routing slip for each of the one or more machine learning algorithms to generate one or more machine learning models. The machine learning model training step generating a machine learning model using parameters selected in the machine learning parameter selection step. The computer program code further comprising sets of instructions to determine an accuracy score for each of the one or more machine learning models. The computer program code further comprising sets of instructions to present the accuracy score for each of the one or more machine learning models to the user via the conversational interface.

In some embodiments of the non-transitory computer-readable medium, the performing the sequence of processing steps specified in the routing slip for each of the one or more machine learning algorithms includes attaching the routing slip for each of the one or more machine learning algorithms to the dataset and successively routing the dataset to a plurality of microservices specified in a routing table.

In some embodiments of the non-transitory computer-readable medium, the computer program code further comprises sets of instructions to track a status of each of the sequence of processing steps in the routing slip and notify the user via the conversational interface of the status of each of the sequence of processing steps as the processing steps are performed.

In some embodiments of the non-transitory computer-readable medium, the computer program code further comprises sets of instructions to analyze the dataset to identify data preprocessing steps that may be performed and query the user via the conversational interface as to whether preprocessing of the dataset should be performed based on the analysis of the dataset.

In some embodiments of the non-transitory computer-readable medium, the determination of the one or more machine learning algorithms is further based on a size of the dataset and a number of variables in the dataset.

In some embodiments of the non-transitory computer-readable medium, the machine learning problem type includes a classification problem type or a regression problem type.

In some embodiments of the non-transitory computer-readable medium, the analysis type comprises sentiment analysis.

Another embodiment provides a computer-implemented method. The computer-implemented method comprises identifying a dataset based on a user selection. The computer-implemented method further comprises determining a machine learning problem type and an analysis type based on user input provided to a conversational interface. The computer-implemented method further comprises determining one or more machine learning algorithms based on the dataset, the machine learning problem type, and the analysis type. The computer-implemented method further comprises generating a routing slip for each of the one or more machine learning algorithms based on the dataset, the machine learning problem type, and the analysis type. Each routing slip specifies a sequence of processing steps based on the dataset and a particular machine learning algorithm. The sequence of processing steps including a machine learning parameter selection step and a machine learning model training step. The computer-implemented method further comprises performing the sequence of processing steps specified in the routing slip for each of the one or more machine learning algorithms to generate one or more machine learning models. The machine learning model training step generating a machine learning model using parameters selected in the machine learning parameter selection step. The computer-implemented method further comprises determining an accuracy score for each of the one or more machine learning models. The computer-implemented method further comprises presenting the accuracy score for each of the one or more machine learning models to the user via the conversational interface.

In some embodiments of the computer-implemented method, the performing the sequence of processing steps specified in the routing slip for each of the one or more machine learning algorithms includes attaching the routing slip for each of the one or more machine learning algorithms to the dataset and successively routing the dataset to a plurality of microservices specified in a routing table.

In some embodiments of the computer-implemented method, the method further comprises tracking a status of each of the sequence of processing steps in the routing slip and notifying the user via the conversational interface of the status of each of the sequence of processing steps as the processing steps are performed.

In some embodiments of the computer-implemented method, the method further comprises analyzing the dataset to identify data preprocessing steps that may be performed and querying the user via the conversational interface as to whether preprocessing of the dataset should be performed based on the analysis of the dataset.

In some embodiments of the computer-implemented method, the determination of the one or more machine learning algorithms is further based on a size of the dataset and a number of variables in the dataset.

In some embodiments of the computer-implemented method, the machine learning problem type includes a classification problem type or a regression problem type.

In some embodiments of the computer-implemented method, the analysis type comprises sentiment analysis.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A computer system, comprising:
one or more processors; and
one or more machine-readable medium coupled to the one or more processors and storing computer program code comprising sets of instructions executable by the one or more processors to:
identify a dataset based on a user selection;
determine a machine learning problem type and an analysis type based on user input provided to a conversational interface;
determine one or more machine learning algorithms based on the dataset, the machine learning problem type, and the analysis type;
generate a routing slip for each of the one or more machine learning algorithms based on the dataset, the machine learning problem type, and the analysis type, each routing slip specifying a sequence of processing steps based on the dataset and a particular machine learning algorithm, the sequence of processing steps including an exploratory data analysis step, a machine learning parameter selection step and a machine learning model training step;
perform the sequence of processing steps specified in the routing slip for each of the one or more machine learning algorithms to generate one or more machine learning models, the machine learning model training step generating a machine learning model using parameters selected in the machine learning parameter selection step;
receive, before completion of the sequence of processing steps and after review of the exploratory data analysis step by a user, a request to return to a particular step in the sequence of processing steps specified in the routing slip, the request comprising one or more new parameters received at the conversational interface;
in response to the request, return to the particular step specified in the routing slip;
process the particular step according to the one or more new parameters;
continue performing the sequence of processing steps after the particular step according to the sequence of steps specified in the routing slip;
determine an accuracy score for each of the one or more machine learning models; and
present the accuracy score for each of the one or more machine learning models to the user via the conversational interface.

2. The computer system of claim 1, wherein performing the sequence of processing steps specified in the routing slip for each of the one or more machine learning algorithms includes attaching the routing slip for each of the one or more machine learning algorithms to the dataset and successively routing the dataset to a plurality of microservices specified in a routing table.

3. The computer system of claim 1, wherein the computer program code further comprises sets of instructions executable by the one or more processors to:
track a status of each of the sequence of processing steps in the routing slip; and
notify the user via the conversational interface of the status of each of the sequence of processing steps as the processing steps are performed.

4. The computer system of claim 1, wherein the computer program code further comprises sets of instructions executable by the one or more processors to:
analyze the dataset to identify data preprocessing steps that may be performed; and
query the user via the conversational interface as to whether preprocessing of the dataset should be performed based on the analysis of the dataset.

5. The computer system of claim 1, wherein the determination of the one or more machine learning algorithms is further based on a size of the dataset and a number of variables in the dataset.

6. The computer system of claim 1, wherein the machine learning problem type includes a classification problem type or a regression problem type.

7. The computer system of claim 1, wherein the analysis type comprises sentiment analysis.

8. One or more non-transitory computer-readable medium storing computer program code comprising sets of instructions to:
identify a dataset based on a user selection;
determine a machine learning problem type and an analysis type based on user input provided to a conversational interface;
determine one or more machine learning algorithms based on the dataset, the machine learning problem type, and the analysis type;
generate a routing slip for each of the one or more machine learning algorithms based on the dataset, the machine learning problem type, and the analysis type, each routing slip specifying a sequence of processing steps based on the dataset and a particular machine learning algorithm, the sequence of processing steps including an exploratory data analysis step, a machine learning parameter selection step and a machine learning model training step;

perform the sequence of processing steps specified in the routing slip for each of the one or more machine learning algorithms to generate one or more machine learning models, the machine learning model training step generating a machine learning model using parameters selected in the machine learning parameter selection step;

receive, before completion of the sequence of processing steps and after review of the exploratory data analysis step by a user, a request to return to a particular step in the sequence of processing steps specified in the routing slip, the request comprising one or more new parameters received at the conversational interface;

in response to the request, return to the particular step specified in the routing slip;

process the particular step according to the one or more new parameters;

continue performing the sequence of processing steps after the particular step according to the sequence of steps specified in the routing slip;

determine an accuracy score for each of the one or more machine learning models; and present the accuracy score for each of the one or more machine learning models to the user via the conversational interface.

9. The non-transitory computer-readable medium of claim 8, wherein performing the sequence of processing steps specified in the routing slip for each of the one or more machine learning algorithms includes attaching the routing slip for each of the one or more machine learning algorithms to the dataset and successively routing the dataset to a plurality of microservices specified in a routing table.

10. The non-transitory computer-readable medium of claim 8, wherein the computer program code further comprises sets of instructions to:

track a status of each of the sequence of processing steps in the routing slip; and notify the user via the conversational interface of the status of each of the sequence of processing steps as the processing steps are performed.

11. The non-transitory computer-readable medium of claim 8, wherein the computer program code further comprises sets of instructions to:

analyze the dataset to identify data preprocessing steps that may be performed; and query the user via the conversational interface as to whether preprocessing of the dataset should be performed based on the analysis of the dataset.

12. The non-transitory computer-readable medium of claim 8, wherein the determination of the one or more machine learning algorithms is further based on a size of the dataset and a number of variables in the dataset.

13. The non-transitory computer-readable medium of claim 8, wherein machine learning problem types includes a classification problem type or a regression problem type.

14. The non-transitory computer-readable medium of claim 8, wherein the analysis type comprises sentiment analysis.

15. A computer-implemented method, comprising:
identifying a dataset based on a user selection;

determining a machine learning problem type and an analysis type based on user input provided to a conversational interface;

determining one or more machine learning algorithms based on the dataset, the machine learning problem type, and the analysis type;

generating a routing slip for each of the one or more machine learning algorithms based on the dataset, the machine learning problem type, and the analysis type, each routing slip specifying a sequence of processing steps based on the dataset and a particular machine learning algorithm, the sequence of processing steps including an exploratory data analysis step, a machine learning parameter selection step and a machine learning model training step;

performing the sequence of processing steps specified in the routing slip for each of the one or more machine learning algorithms to generate one or more machine learning models, the machine learning model training step generating a machine learning model using parameters selected in the machine learning parameter selection step;

receiving, before completion of the sequence of processing steps and after review of the exploratory data analysis step by a user, a request to return a particular step in the sequence of processing steps specified in the routing slip, the request comprising one or more new parameters received at the conversational interface;

in response to the request, returning to the particular step specified in the routing slip;

processing the particular step according to the one or more new parameters;

continuing performing the sequence of processing steps after the particular step according to the sequence of steps specified in the routing slip;

determining an accuracy score for each of the one or more machine learning models; and presenting the accuracy score for each of the one or more machine learning models to the user via the conversational interface.

16. The computer-implemented method of claim 15, wherein performing the sequence of processing steps specified in the routing slip for each of the one or more machine learning algorithms includes attaching the routing slip for each of the one or more machine learning algorithms to the dataset and successively routing the dataset to a plurality of microservices specified in a routing table.

17. The computer-implemented method of claim 15, further comprising:

tracking a status of each of the sequence of processing steps in the routing slip; and notifying the user via the conversational interface of the status of each of the sequence of processing steps as the processing steps are performed.

18. The computer-implemented method of claim 15, further comprising:

analyzing the dataset to identify data preprocessing steps that may be performed; and querying the user via the conversational interface as to whether preprocessing of the dataset should be performed based on the analysis of the dataset.

19. The computer-implemented method of claim 15, wherein the determination of the one or more machine learning algorithms is further based on a size of the dataset and a number of variables in the dataset.

20. The computer-implemented method of claim 15, wherein the machine learning problem type includes a classification problem type or a regression problem type, and wherein the analysis type comprises sentiment analysis.

* * * * *